(12) United States Patent
Wallach et al.

(10) Patent No.: US 6,499,073 B1
(45) Date of Patent: Dec. 24, 2002

(54) SYSTEM USING PROGRAMMABLE PROCESSOR FOR SELECTIVELY ENABLING OR DISABLING POWER TO ADAPTER IN RESPONSE TO RESPECTIVE REQUEST SIGNALS

(75) Inventors: Walter A. Wallach, Los Altos; Mehrdad Khalili, San Jose; Mallikarjunan Mahalingam, Santa Clara; John M. Reed, Morgan Hill, all of CA (US)

(73) Assignee: Micron Electronics, Inc., Nampa, ID (US)

( * ) Notice: Subject to any disclaimer, the term of this patent is extended or adjusted under 35 U.S.C. 154(b) by 0 days.

(21) Appl. No.: 08/942,309

(22) Filed: Oct. 1, 1997

Related U.S. Application Data

(60) Provisional application No. 60/047,016, filed on May 13, 1997, provisional application No. 60/046,416, filed on May 13, 1997, provisional application No. 60/046,311, filed on May 13, 1997, provisional application No. 60/046,398, filed on May 13, 1997, and provisional application No. 60/046,312, filed on May 13, 1997.

(51) Int. Cl.⁷ ............................................. G06F 13/00
(52) U.S. Cl. ....................... 710/103; 710/102; 710/129; 713/340
(58) Field of Search .................. 395/281–283, 395/822, 828, 830–833, 836, 500, 284, 892; 713/310, 330, 340; 710/101–103, 2, 8, 10, 11–13, 72, 104, 129

(56) References Cited

U.S. PATENT DOCUMENTS

| | | | |
|---|---|---|---|
| 4,057,847 A | 11/1977 | Lowell et al. ............... 364/200 |
| 4,100,597 A | 7/1978 | Fleming et al. .............. 364/474 |
| 4,449,182 A | 5/1984 | Rubinson et al. |
| 4,672,535 A | 6/1987 | Katzman et al. ............ 364/200 |
| 4,692,918 A | 9/1987 | Elliott et al. .................. 370/85 |
| 4,695,946 A | 9/1987 | Andreasen et al. .......... 364/200 |
| 4,707,803 A | 11/1987 | Anthony, Jr. et al. |
| 4,769,764 A | 9/1988 | Levanon ....................... 364/708 |
| 4,774,502 A | 9/1988 | Kimura ........................ 340/501 |
| 4,821,180 A | 4/1989 | Gerety et al. ................ 364/200 |
| 4,835,737 A | 5/1989 | Herrig et al. |

(List continued on next page.)

FOREIGN PATENT DOCUMENTS

| | | | |
|---|---|---|---|
| EP | 0 866 403 A1 | 9/1998 | |
| JP | 04 333 118 A | 11/1992 | ............ G06F/1/18 |
| JP | 05 233 110 A | 9/1993 | ............ G06F/3/00 |
| JP | 07 093 064 A | 4/1995 | ............ G06F/1/26 |
| JP | 07 261 874 A | 10/1995 | ............ G06F/1/18 |

OTHER PUBLICATIONS

"Detailed Overview of the PC Card Standard", Standards Overview, Sep. 30, 1997, 9 pp.
Goodrum, "PCI Bus Hot Plug Specification", PCI Sign Membership, Jun. 15, 1997, 29 pp.
Microsoft Corporation, "Supporting Removable Devices under Windows and Windows NT", Aug. 13, 1997, 4 pp.
Compaq Computer Corporation, "Plug and Play BIOS Specification", Version 1.0A, May 5, 1994, 56 pp.
Goble, et al., "Intelligent I/O Architecture", I₂O Sig, Jun. 1996, 22 pp.
NetFRAME Systems Inc., "NF450FT Network Mainframe", 14 pp.

(List continued on next page.)

Primary Examiner—Robert Beausoleil
Assistant Examiner—Raymond N Phan
(74) Attorney, Agent, or Firm—Knobbe, Martens Olson & Bear, LLP

(57) ABSTRACT

A software architecture for the hot add and swap of adapters. The software architecture allows users to replace failed components, upgrade outdated components, and add new functionality, such as new network interfaces, disk interface adapters and storage, without impacting existing users. The software architecture supports the hot add and swap of off-the-shelf adapters, including those adapters that are programmable.

14 Claims, 19 Drawing Sheets

U.S. PATENT DOCUMENTS

| | | | |
|---|---|---|---|
| 4,894,792 A | 1/1990 | Mitchell et al. ............. 364/708 |
| 4,949,245 A | 8/1990 | Martin et al. |
| 4,968,977 A | 11/1990 | Chinnaswamy et al. . 340/825.8 |
| 4,999,787 A | 3/1991 | McNally et al. |
| 5,006,961 A | 4/1991 | Monico |
| 5,007,431 A | 4/1991 | Donehoo, III ............... 128/696 |
| 5,033,048 A | 7/1991 | Pierce et al. ............... 371/21.2 |
| 5,051,720 A | 9/1991 | Kittirutsunetorn ...... 340/310 R |
| 5,073,932 A | 12/1991 | Yossifor et al. ............... 380/23 |
| 5,103,391 A | 4/1992 | Barrett ....................... 364/133 |
| 5,118,970 A | 6/1992 | Olson et al. ................. 307/443 |
| 5,121,500 A | 6/1992 | Arlington et al. ........... 395/750 |
| 5,123,017 A | 6/1992 | Simpkins et al. .......... 371/15.1 |
| 5,136,708 A | 8/1992 | Lapourtre et al. .......... 395/650 |
| 5,136,715 A | 8/1992 | Hirose et al. ............... 395/775 |
| 5,138,619 A | 8/1992 | Fasang et al. .............. 371/21.1 |
| 5,157,663 A | 10/1992 | Major et al. .................. 371/9.1 |
| 5,210,855 A | 5/1993 | Bartol ......................... 395/500 |
| 5,222,897 A | 6/1993 | Collins et al. ............... 439/157 |
| 5,245,615 A | 9/1993 | Treu ........................... 371/16.5 |
| 5,247,683 A | 9/1993 | Holmes et al. .............. 395/700 |
| 5,253,348 A | 10/1993 | Scalise ........................ 395/325 |
| 5,261,094 A | 11/1993 | Everson et al. ............. 395/600 |
| 5,265,098 A | 11/1993 | Mattson et al. ............ 371/11.1 |
| 5,266,838 A | 11/1993 | Gerner ........................ 307/19 |
| 5,269,011 A | 12/1993 | Yanai et al. |
| 5,272,382 A | 12/1993 | Heald et al. .................. 307/66 |
| 5,272,584 A | 12/1993 | Austruy et al. |
| 5,276,814 A | 1/1994 | Bourke et al. ............... 395/275 |
| 5,276,863 A | 1/1994 | Heider ......................... 395/575 |
| 5,277,615 A | 1/1994 | Hastings et al. ............. 439/377 |
| 5,280,621 A | 1/1994 | Barnes et al. ................ 395/800 |
| 5,283,905 A | 2/1994 | Saadeh et al. ............... 395/750 |
| 5,307,354 A | 4/1994 | Cramer et al. |
| 5,311,397 A | 5/1994 | Harshberger et al. ....... 361/683 |
| 5,311,451 A | 5/1994 | Barrett ........................ 364/550 |
| 5,317,693 A | 5/1994 | Cuenod et al. |
| 5,329,625 A | 7/1994 | Kannan et al. |
| 5,337,413 A | 8/1994 | Lui et al. |
| 5,351,276 A | 9/1994 | Doll, Jr. et al. |
| 5,367,670 A | 11/1994 | Ward et al. .................. 395/575 |
| 5,379,184 A | 1/1995 | Barraza et al. .............. 361/685 |
| 5,379,409 A | 1/1995 | Ishikawa ..................... 395/575 |
| 5,386,567 A | 1/1995 | Lien et al. |
| 5,388,267 A | 2/1995 | Chan et al. .................. 395/700 |
| 5,402,431 A | 3/1995 | Saadeh et al. .............. 371/67.1 |
| 5,404,494 A | 4/1995 | Garney |
| 5,423,025 A | 6/1995 | Goldman et al. ............ 395/575 |
| 5,426,740 A | 6/1995 | Bennett ....................... 395/325 |
| 5,430,717 A | 7/1995 | Fowler et al. ............... 370/58.2 |
| 5,430,845 A | 7/1995 | Rimmer et al. .............. 395/275 |
| 5,432,715 A | 7/1995 | Shigematsu et al. ... 364/551.01 |
| 5,432,946 A | 7/1995 | Allard et al. ................ 395/750 |
| 5,438,678 A | 8/1995 | Smith .......................... 395/750 |
| 5,440,748 A * | 8/1995 | Sekine et al. ............. 395/750.1 |
| 5,448,723 A | 9/1995 | Rowett ..................... 395/200.02 |
| 5,455,933 A | 10/1995 | Schieve et al. ......... 395/183.03 |
| 5,460,441 A | 10/1995 | Hastings et al. ............. 312/298 |
| 5,463,766 A | 10/1995 | Schieve et al. .............. 395/650 |
| 5,465,349 A | 11/1995 | Geronimi et al. ........... 364/550 |
| 5,471,634 A | 11/1995 | Giorgio et al. .............. 395/600 |
| 5,473,499 A | 12/1995 | Weir ............................. 361/58 |
| 5,483,419 A | 1/1996 | Kaczeus, Sr. et al. |
| 5,485,550 A | 1/1996 | Dalton ........................... 395/51 |
| 5,485,607 A | 1/1996 | Lomet et al. ................ 395/600 |
| 5,487,148 A | 1/1996 | Komori et al. |
| 5,491,791 A | 2/1996 | Glowny et al. |
| 5,493,574 A | 2/1996 | McKinley |
| 5,493,666 A | 2/1996 | Fitch |
| 5,513,314 A | 4/1996 | Kandasamy et al. ... 395/182.04 |
| 5,513,339 A | 4/1996 | Agrawal et al. ............. 395/500 |
| 5,515,515 A | 5/1996 | Kennedy et al. ............ 395/283 |
| 5,517,646 A | 5/1996 | Piccirillo et al. |
| 5,519,851 A | 5/1996 | Bender et al. ............... 395/500 |
| 5,526,289 A | 6/1996 | Dinh et al. ................... 364/557 |
| 5,528,409 A | 6/1996 | Cucci et al. ................. 359/171 |
| 5,530,810 A | 6/1996 | Bowman ..................... 395/283 |
| 5,533,193 A | 7/1996 | Roscoe .................... 395/183.15 |
| 5,535,326 A | 7/1996 | Baskey et al. .......... 395/182.02 |
| 5,542,055 A | 7/1996 | Amini et al. ................ 395/281 |
| 5,546,272 A | 8/1996 | Moss et al. .................. 361/687 |
| 5,548,712 A | 8/1996 | Larson et al. ........... 395/182.05 |
| 5,555,510 A | 9/1996 | Verseput et al. |
| 5,559,764 A | 9/1996 | Chen et al. .................... 396/30 |
| 5,559,958 A | 9/1996 | Farrand et al. .......... 395/183.03 |
| 5,559,965 A * | 9/1996 | Oztaskin et al. ............ 395/284 |
| 5,560,022 A | 9/1996 | Dunstan et al. ............. 395/750 |
| 5,564,024 A | 10/1996 | Pemberton |
| 5,566,299 A | 10/1996 | Billings et al. ......... 395/182.02 |
| 5,566,339 A | 10/1996 | Perholtz et al. ............. 395/750 |
| 5,568,610 A | 10/1996 | Brown |
| 5,568,619 A | 10/1996 | Blackledge et al. |
| 5,572,403 A | 11/1996 | Mills .......................... 361/695 |
| 5,577,205 A | 11/1996 | Hwang et al. |
| 5,579,487 A | 11/1996 | Meyerson et al. ........... 395/280 |
| 5,579,491 A | 11/1996 | Jeffries et al. ............... 395/283 |
| 5,579,528 A | 11/1996 | Register ...................... 395/671 |
| 5,581,712 A | 12/1996 | Herrman |
| 5,581,714 A | 12/1996 | Amini et al. |
| 5,584,030 A | 12/1996 | Husak et al. ................ 395/750 |
| 5,586,250 A | 12/1996 | Carbonneau et al. .... 395/183.2 |
| 5,588,121 A | 12/1996 | Reddin et al. .......... 395/200.15 |
| 5,588,144 A * | 12/1996 | Inoue et al. ................. 395/555 |
| 5,592,611 A | 1/1997 | Midgely et al. ........ 395/182.02 |
| 5,596,711 A | 1/1997 | Burckhartt et al. ..... 395/182.21 |
| 5,598,407 A | 1/1997 | Bud et al. .................... 370/330 |
| 5,602,758 A | 2/1997 | Lincoln et al. .............. 364/505 |
| 5,604,873 A | 2/1997 | Fite et al. .................... 395/283 |
| 5,606,672 A | 2/1997 | Wade .......................... 395/308 |
| 5,608,865 A | 3/1997 | Midgely et al. ............. 395/180 |
| 5,608,876 A | 3/1997 | Cohen et al. ................ 395/281 |
| 5,615,207 A | 3/1997 | Gephardt et al. ............ 370/237 |
| 5,621,159 A | 4/1997 | Brown et al. ..................... 73/9 |
| 5,622,221 A | 4/1997 | Genga, Jr. et al. .......... 165/208 |
| 5,625,238 A | 4/1997 | Ady et al. ................... 307/147 |
| 5,627,962 A | 5/1997 | Goodrum et al. ....... 395/182.11 |
| 5,628,028 A | 5/1997 | Michelson .................. 395/825 |
| 5,630,076 A | 5/1997 | Saulpaugh et al. .......... 395/284 |
| 5,631,847 A | 5/1997 | Kikinis .................... 364/514 R |
| 5,632,021 A | 5/1997 | Jennings et al. ............ 395/309 |
| 5,636,341 A | 6/1997 | Matsushita et al. .... 395/182.11 |
| 5,638,289 A | 6/1997 | Yamada et al. ............. 364/489 |
| 5,644,470 A | 7/1997 | Benedict et al. ............ 361/686 |
| 5,644,731 A | 7/1997 | Liencres et al. ............. 395/283 |
| 5,651,006 A | 7/1997 | Fujino et al. ................ 370/408 |
| 5,652,832 A | 7/1997 | Kane et al. .................. 395/181 |
| 5,652,833 A | 7/1997 | Takizawa et al. ....... 395/182.08 |
| 5,652,839 A | 7/1997 | Giorgio et al. ......... 395/200.11 |
| 5,652,892 A | 7/1997 | Ugajin ........................ 395/750 |
| 5,652,908 A | 7/1997 | Douglas et al. ............. 395/800 |
| 5,655,081 A | 8/1997 | Bonnell et al. |
| 5,655,083 A | 8/1997 | Bagley .................... 395/182.31 |
| 5,655,148 A * | 8/1997 | Richman et al. ............ 395/282 |
| 5,659,682 A | 8/1997 | Devarakonda et al. |
| 5,664,118 A | 9/1997 | Nishigaki et al. ........... 395/283 |
| 5,664,119 A | 9/1997 | Jeffries et al. ............... 395/383 |
| 5,666,538 A | 9/1997 | DeNicola |
| 5,668,943 A | 9/1997 | Attanasio et al. ....... 395/182.05 |
| 5,668,992 A | 9/1997 | Hammer et al. ............ 395/651 |
| 5,669,009 A | 9/1997 | Buktenica et al. ..... 395/800.35 |
| 5,671,371 A | 9/1997 | Kondo et al. ............... 395/306 |

| Patent | Date | Inventor | Class |
|---|---|---|---|
| 5,675,723 A | 10/1997 | Ekrot et al. | |
| 5,680,288 A | 10/1997 | Carey et al. | 361/118 |
| 5,682,328 A | 10/1997 | Roeber et al. | 364/550 |
| 5,684,671 A | 11/1997 | Hobbs et al. | |
| 5,689,637 A | 11/1997 | Johnson et al. | |
| 5,696,895 A | 12/1997 | Hemphill et al. | 395/182.02 |
| 5,696,899 A | 12/1997 | Kalwitz | |
| 5,696,949 A | 12/1997 | Young | 395/551 |
| 5,696,970 A | 12/1997 | Sandage et al. | 395/681 |
| 5,701,417 A | 12/1997 | Lewis et al. | 395/200.16 |
| 5,704,031 A | 12/1997 | Mikami et al. | 395/182.02 |
| 5,708,775 A | 1/1998 | Nakamura | 395/185.01 |
| 5,708,776 A | 1/1998 | Kikinis | 395/185.08 |
| 5,712,754 A * | 1/1998 | Sides et al. | 361/58 |
| 5,715,456 A | 2/1998 | Bennett et al. | 395/652 |
| 5,717,570 A | 2/1998 | Kikinis | 361/685 |
| 5,721,935 A | 2/1998 | DeSchepper et al. | 395/750 |
| 5,724,529 A * | 3/1998 | Smith et al. | 395/309 |
| 5,726,506 A * | 3/1998 | Wood | 707/147 |
| 5,727,207 A | 3/1998 | Gates et al. | 395/651 |
| 5,732,266 A | 3/1998 | Moore et al. | 395/651 |
| 5,737,708 A | 4/1998 | Grob et al. | 455/557 |
| 5,737,747 A | 4/1998 | Vishlitzky et al. | 711/118 |
| 5,740,378 A | 4/1998 | Rehl et al. | 395/283 |
| 5,742,514 A | 4/1998 | Bonola | 364/492 |
| 5,742,833 A | 4/1998 | Dea et al. | 395/750.05 |
| 5,747,889 A | 5/1998 | Raynham et al. | 307/80 |
| 5,748,426 A | 5/1998 | Bedingfield et al. | 361/58 |
| 5,752,164 A | 5/1998 | Jones | 455/33.1 |
| 5,754,396 A | 5/1998 | Felcman et al. | 361/683 |
| 5,754,449 A | 5/1998 | Hoshal et al. | 364/550 |
| 5,754,797 A * | 5/1998 | Takahashi | 710/103 |
| 5,758,165 A | 5/1998 | Shuff | 395/712 |
| 5,758,352 A | 5/1998 | Reynolds et al. | 707/200 |
| 5,761,033 A | 6/1998 | Wilhelm | 361/686 |
| 5,761,045 A | 6/1998 | Olson et al. | 364/726 |
| 5,761,085 A | 6/1998 | Giorgio | 364/505 |
| 5,761,462 A | 6/1998 | Neal et al. | |
| 5,761,707 A | 6/1998 | Aiken et al. | 711/118 |
| 5,764,924 A | 6/1998 | Hong | 395/281 |
| 5,764,968 A | 6/1998 | Ninomiya | 395/560 |
| 5,765,008 A * | 6/1998 | Desai et al. | 395/800.01 |
| 5,765,198 A | 6/1998 | McCrocklin et al. | 711/165 |
| 5,767,844 A | 6/1998 | Stoye | 345/212 |
| 5,768,541 A * | 6/1998 | Pan-Ratzlaff | 395/283 |
| 5,768,542 A | 6/1998 | Enstrom et al. | 395/284 |
| 5,771,343 A | 6/1998 | Hafner et al. | 395/182.02 |
| 5,774,640 A | 6/1998 | Kurio | 395/182.02 |
| 5,774,645 A | 6/1998 | Beaujard et al. | 395/183.01 |
| 5,774,741 A * | 6/1998 | Choi | 395/822 |
| 5,777,897 A | 7/1998 | Giorgio | 364/557 |
| 5,778,197 A | 7/1998 | Dunham | 395/284 |
| 5,781,703 A | 7/1998 | Desai et al. | |
| 5,781,716 A | 7/1998 | Hemphill et al. | 395/182.02 |
| 5,781,744 A | 7/1998 | Johnson et al. | 395/283 |
| 5,781,767 A | 7/1998 | Inoue et al. | 395/555 |
| 5,781,798 A | 7/1998 | Beatty et al. | 395/830 |
| 5,784,555 A | 7/1998 | Stone | 395/200.5 |
| 5,784,576 A * | 7/1998 | Guthrie et al. | 710/103 |
| 5,787,019 A | 7/1998 | Knight et al. | 364/550 |
| 5,787,459 A | 7/1998 | Stallmo et al. | 711/112 |
| 5,787,491 A | 7/1998 | Merkin et al. | 711/173 |
| 5,790,775 A | 8/1998 | Marks et al. | 395/182.07 |
| 5,790,831 A | 8/1998 | Lin et al. | 395/500 |
| 5,793,948 A | 8/1998 | Asahi et al. | 395/184.01 |
| 5,793,987 A * | 8/1998 | Quackenbush et al. | 710/103 |
| 5,793,992 A | 8/1998 | Steele et al. | 395/293 |
| 5,794,035 A | 8/1998 | Golub et al. | 397/674 |
| 5,796,185 A | 8/1998 | Takata et al. | 307/140 |
| 5,796,580 A | 8/1998 | Komatsu et al. | 361/687 |
| 5,796,934 A | 8/1998 | Bhanot et al. | 395/182.02 |
| 5,796,981 A | 8/1998 | Abudayyeh et al. | 395/500 |
| 5,797,023 A | 8/1998 | Berman et al. | 395/750.06 |
| 5,798,828 A | 8/1998 | Thomas et al. | 356/141.3 |
| 5,799,036 A | 8/1998 | Staples | 375/222 |
| 5,799,196 A | 8/1998 | Flannery | 395/750.03 |
| 5,801,921 A | 9/1998 | Miller | |
| 5,802,269 A | 9/1998 | Poisner et al. | 395/183.2 |
| 5,802,298 A | 9/1998 | Imai et al. | 395/200.47 |
| 5,802,305 A | 9/1998 | McKaughan et al. | 395/200.57 |
| 5,802,324 A | 9/1998 | Wunderlich et al. | 395/281 |
| 5,802,393 A | 9/1998 | Begun et al. | 395/830 |
| 5,802,552 A | 9/1998 | Fandrich et al. | 711/103 |
| 5,802,592 A | 9/1998 | Chess et al. | 711/164 |
| 5,803,357 A | 9/1998 | Lakin | 236/78 B |
| 5,805,804 A | 9/1998 | Laursen et al. | 395/200.02 |
| 5,805,834 A | 9/1998 | McKinley et al. | 395/283 |
| 5,809,224 A | 9/1998 | Schultz et al. | 395/182.05 |
| 5,809,256 A * | 9/1998 | Najemy | 710/103 |
| 5,809,287 A | 9/1998 | Stupek, Jr. et al. | 395/500 |
| 5,809,311 A | 9/1998 | Jones | 395/750.01 |
| 5,809,555 A | 9/1998 | Hobson | 711/172 |
| 5,812,748 A | 9/1998 | Ohran et al. | 395/182.02 |
| 5,812,750 A | 9/1998 | Dev et al. | |
| 5,812,757 A | 9/1998 | Okamoto et al. | 395/182.09 |
| 5,812,858 A | 9/1998 | Nookala et al. | 395/773 |
| 5,815,117 A | 9/1998 | Kolanek | 342/442 |
| 5,815,647 A | 9/1998 | Buckland et al. | 395/182.01 |
| 5,815,651 A | 9/1998 | Litt | 395/182.08 |
| 5,815,652 A | 9/1998 | Ote et al. | |
| 5,821,596 A | 10/1998 | Miu et al. | 257/419 |
| 5,822,547 A * | 10/1998 | Boesch et al. | 710/103 |
| 5,826,043 A | 10/1998 | Smith et al. | 395/281 |
| 5,829,046 A | 10/1998 | Tzelnic et al. | 711/162 |
| 5,835,719 A | 11/1998 | Gibson et al. | 395/200.51 |
| 5,835,738 A | 11/1998 | Blackledge, Jr. et al. | |
| 5,838,932 A | 11/1998 | Alzien | 395/308 |
| 5,838,935 A | 11/1998 | Davis et al. | 395/309 |
| 5,841,964 A | 11/1998 | Yamaguchi | 395/113.21 |
| 5,841,991 A | 11/1998 | Russell | |
| 5,845,061 A | 12/1998 | Miyamoto et al. | 395/182.02 |
| 5,845,095 A | 12/1998 | Reed et al. | 395/283 |
| 5,850,546 A | 12/1998 | Kim | 395/651 |
| 5,852,720 A | 12/1998 | Gready et al. | |
| 5,852,724 A | 12/1998 | Glenn, II et al. | 395/200.69 |
| 5,857,074 A | 1/1999 | Johnson | |
| 5,857,102 A | 1/1999 | McChesney et al. | 395/653 |
| 5,864,653 A | 1/1999 | Tavallaei et al. | 315/181 |
| 5,864,654 A | 1/1999 | Marchant | 395/182.01 |
| 5,864,713 A | 1/1999 | Terry | 395/872 |
| 5,867,730 A | 2/1999 | Leyda | 395/830 |
| 5,875,307 A | 2/1999 | Ma et al. | 395/281 |
| 5,875,308 A * | 2/1999 | Egan et al. | 710/103 |
| 5,875,310 A | 2/1999 | Buckland et al. | 395/306 |
| 5,878,237 A | 3/1999 | Olarig | 395/308 |
| 5,878,238 A | 3/1999 | Gan et al. | 395/308 |
| 5,881,311 A | 3/1999 | Woods | 395/824 |
| 5,884,027 A | 3/1999 | Garbus et al. | 395/200.8 |
| 5,884,049 A | 3/1999 | Atkinson | 395/281 |
| 5,886,424 A | 3/1999 | Kim | 307/64 |
| 5,889,965 A | 3/1999 | Wallach et al. | 395/283 |
| 5,892,898 A | 4/1999 | Fujii et al. | 395/185.1 |
| 5,892,915 A | 4/1999 | Duso et al. | 395/200.49 |
| 5,892,928 A | 4/1999 | Wallach et al. | 395/283 |
| 5,893,140 A | 4/1999 | Vahalia et al. | 711/118 |
| 5,898,846 A | 4/1999 | Kelly | 395/284 |
| 5,898,888 A | 4/1999 | Guthrie et al. | 395/308 |
| 5,905,867 A | 5/1999 | Giorgio | 395/200.54 |
| 5,907,672 A | 5/1999 | Matze et al. | 395/182.06 |
| 5,909,568 A | 6/1999 | Nason | 395/500 |
| 5,911,779 A | 6/1999 | Stallmo et al. | 714/6 |
| 5,913,034 A | 6/1999 | Malcolm | 395/200.53 |

| | | | |
|---|---|---|---|
| 5,918,057 A | | 6/1999 | Chou et al. .................. 395/733 |
| 5,922,060 A | * | 7/1999 | Goodrum ..................... 710/103 |
| 5,930,358 A | | 7/1999 | Rao .............................. 380/4 |
| 5,935,262 A | | 8/1999 | Barrett et al. ................. 714/46 |
| 5,936,960 A | | 8/1999 | Stewart ....................... 370/438 |
| 5,938,751 A | * | 8/1999 | Tavallaei et al. ............ 710/103 |
| 5,941,996 A | | 8/1999 | Smith et al. .................. 714/47 |
| 5,964,855 A | | 10/1999 | Bass et al. ................... 710/103 |
| 5,983,349 A | | 11/1999 | Kodama et al. ............ 713/200 |
| 5,987,554 A | | 11/1999 | Liu et al. ..................... 710/129 |
| 5,987,621 A | | 11/1999 | Duso et al. ..................... 714/4 |
| 5,987,627 A | | 11/1999 | Rawlings, III ............... 714/48 |
| 6,012,130 A | | 1/2000 | Beyda et al. ................ 711/173 |
| 6,038,624 A | | 3/2000 | Chan et al. .................. 710/103 |

OTHER PUBLICATIONS

Davis, T, Usenet post to alt.msdos.programmer, Apr. 1997, "Re: How do I create an FDISK batch file?"

Davis, T., Usenet post to alt.msdos.batch, Apr. 1997, "Re: Need help with automating FDISK and FORMAT . . . ".

NetFrame Systems Incorporated, Doc. No. 78–1000226–01, pp. 1–2, 5–8, 359–404, and 471–512, Apr. 1996, "NetFrame Clustered Multiprocessing Software: NW0496 DC–ROM for Novell® NetWare® 4.1 SMP, 4.1, and 3.12."

Shanley, and Anderson, PCI System Architecture, Third Edition, Chapter 15, pp. 297–302, Copyright 1995, "Intro To Configuration Address Space."

Shanley, and Anderson, PCI System Architecture, Third Edition, Chapter 16, pp. 303–328, Copyright 1995, "Configuration Transactions."

Sun Microsystems Computer Company, Part No. 802–5355–10, Rev. A, May 1996, "Solstice SyMON User's Guid."

Sun Microsystems, Part No. 802–6569–11, Release 1.0.1, Nov. 1996, "Remote Systems Diagnostics Installation & User Guide."

NetFRAME Systems Incorporated, News Release, 3 pages, referring to May 9, 1994, "NetFRAME's New High–Availability ClusterServer Systems Avoid Scheduled as well as Unscheduled Downtime."

NetFRAME Systems Incorporated, datasheet, 2 pages, Feb. 1996, "NF450FT Network Mainframe."

NetFRAME Systems Incorporated, datasheet, 9 pages, Mar. 1996, "NetFRAME Cluster Server 8000."

Herr, et al., Linear Technology Magazine, Design Features, pp. 21–23, Jun. 1997. "Hot Swapping the PCI Bus."

Shanley and Anderson, PCI System Architecture, Third Edition, Chapters 15 & 16, pp. 297–328, CR 1995.

PCI Hot–Plug Specification, Preliminary Revision for Review Only, Revision 0.9, pp. i–vi, and 1–25, Mar. 5, 1997.

SES SCSI–3 Enclosure Services, X3T10/Project 1212–D/Rev 8a, pp. i, iii–x, 1–76, and L–1 (index), Jan. 16, 1997.

Compaq Computer Corporation, Technology Brief, pp. 1–13, Dec. 1996, "Where Do I Plug the Cable? Solving the Logical–Physical Slot Numbering Problem."

Gorlick, M., Conf. Proceedings: ACM/ONR Workshop on Parallel and Distributed Debugging, pp. 175–181, 1991, "The Flight Recorder: An Architectural Aid for System Monitoring."

IBM Technical Disclosure Bulletin, 92A+62947, pp. 391–394, Oct. 1992, Method for Card Hot Plug Detection and Control.

Lyons, Computer Reseller News, Issue 721, pp. 61–62, Feb. 3, 1997, "ACC Releases Low–Cost Solution for ISPs."

M2 Communications, M2 Presswire, 2 pages, Dec. 19, 1996, "Novell IntranetWare Supports Hot Pluggable PCI from NetFRAME."

Rigney, PC Magazine, 14(17): 375–379, Oct. 10, 1995, "The One for the Road (Mobile–aware capabilities in Windows 95)."

Shanley, and Anderson, PCI System Architecture, Third Edition, p. 382, Copyright 1995.

ftp.cdrom.com/pub/os2/diskutil/, PHDX software, phdx.zip download, Mar. 1995, "Parallel Hard Disk Xfer."

Cmasters, Usenet post to microsoft.public.windowsnt.setup, Aug. 1997, "Re: FDISK switches."

Hildebrand, N., Usenet post to comp.msdos.programmer, May 1995, "Re: Structure of disk partition into."

Lewis, L., Usenet post to alt.msdos.batch, Apr. 1997, "Re: Need help with automating FDISK and FORMAT."

Netframe, http://www.netframe–support.com/technology.datasheets.data.htm, before Mar. 1997, "Netframe Cluster-System 9008 Data Sheet."

Simos, M., Usenet post to comp.os.msdos.misc, Apr. 1997, "Re: Auto FDISK and FORMAT."

Wood, M. H., Usenet post to comp.os.netware.misc, Aug. 1996, "Re: Workstation duplication method for WIN95."

Haban, D. & D. Wybranietz, IEEE Transaction on Software Engineering, 16(2):197–211, Feb. 1990, "A Hybrid Monitor for Behavior and Performance Analysis of Distributed Systems".

* cited by examiner

SYSTEM USING PROGRAMMABLE PROCESSOR FOR SELECTIVELY ENABLING OR DISABLING POWER TO ADAPTER IN RESPONSE TO RESPECTIVE REQUEST SIGNALS

RELATED APPLICATIONS

This application is related to U.S. application Ser. No. 08/942,306, entitled "METHOD FOR THE HOT ADD OF DEVICES"; U.S. application Ser. No. 08/942,282, entitled "HOT SWAP OF DEVICES SOFTWARE ARCHITECTURE"; U.S. application Ser. No. 08/942,459, entitled "METHOD FOR THE HOT SWAP OF DEVICES"; U.S. application Ser. No. 08/962,963, entitled "METHOD FOR THE HOT ADD OF A NETWORK ADAPTER ON A SYSTEM INCLUDING A DYNAMICALLY LOADED ADAPTER DRIVER"; U.S. application Ser. No. 08/942,465, entitled "METHOD FOR THE HOT ADD OF A MASS STORAGE ADAPTER ON A SYSTEM INCLUDING A STATICALLY LOADED ADAPTER DRIVER"; U.S. application Ser. No. 08/943,072, entitled "METHOD FOR THE HOT ADD OF A NETWORK ADAPTER ON A SYSTEM INCLUDING A STATICALLY LOADED ADAPTER DRIVER"; U.S. application Ser. No. 08/942,069, entitled "METHOD FOR THE HOT ADD OF A MASS STORAGE ADAPTER ON A SYSTEM INCLUDING A DYNAMICALLY LOADED ADAPTER DRIVER"; U.S. application Ser. No. 08/942,458, entitled "METHOD FOR THE HOT SWAP OF A NETWORK ADAPTER ON A SYSTEM INCLUDING A DYNAMICALLY LOADED ADAPTER DRIVER"; U.S. application Ser. No. 08/942,336, entitled "METHOD FOR THE HOT SWAP OF A MASS STORAGE ADAPTER ON A SYSTEM INCLUDING A STATICALLY LOADED ADAPTER DRIVER"; U.S. application Ser. No. 08/943,078, entitled "METHOD FOR THE HOT SWAP OF A NETWORK ADAPTER ON A SYSTEM INCLUDING A STATICALLY LOADED ADAPTER DRIVER"; and U.S. application Ser. No. 08/942,457, entitled "METHOD FOR THE HOT SWAP OF A MASS STORAGE ADAPTER ON A SYSTEM INCLUDING A DYNAMICALLY LOADED ADAPTER DRIVER"; which are being filed concurrently herewith on Oct. 1, 1997.

PRIORITY CLAIM

The benefit under 35 U.S.C. §119(e) of the following U.S. provisional application(s) is hereby claimed:

| Title | Application No. | Filing Date |
|---|---|---|
| "Hardware and Software Architecture for Inter-Connecting an Environmental Management System with a Remote Interface" | 60/047,016 | May 13, 1997 |
| "Self Management Protocol for a Fly-By-Wire Service Processor" | 60/046,416 | May 13, 1997 |
| "Hot Plug Software Architecture for Off the Shelf Operating Systems" | 60/046,311 | May 13, 1997 |
| "Computer System Hardware Infrastructure for Hot Plugging Single and Multi-Function PCI Cards Without Embedded Bridges" | 60/046,398 | May 13, 1997 |
| "Computer System Hardware Infrastructure for Hot Plugging Multi-Function PCI Cards With Embedded Bridges" | 60/046,312 | May 13, 1997 |

APPENDICES

Appendix A, which forms a part of this disclosure, is a list of commonly owned copending U.S. patent applications. Each one of the applications listed in Appendix A is hereby incorporated herein in its entirety by reference thereto.

Appendix B, which forms part of this disclosure, is a copy of the U.S. provisional patent application filed May 13, 1997, entitled "HOT PLUG SOFTWARE ARCHITECTURE FOR OFF THE SHELF OPERATING SYSTEMS" and assigned Application No. 60/046311. Page 1, line 7 of the provisional application has been changed from the original to positively recite that the entire provisional application, including the attached documents, forms part of this disclosure.

Appendix C, which forms part of this disclosure, is a copy of the U.S. provisional patent application filed May 13, 1997, entitled "COMPUTER SYSTEM HARDWARE INFRASTRUCTURE FOR HOT PLUGGING SINGLE AND MULTI-FUNCTION PCI CARDS WITHOUT EMBEDDED BRIDGES" and assigned application Ser. No. 60/046,398. Page 1, line 7 of the provisional application has been changed from the original to positively recite that the entire provisional application, including the attached documents, forms part of this disclosure.

Appendix D, which forms part of this disclosure, is a copy of the U.S. provisional patent application filed May 13, 1997, entitled "COMPUTER SYSTEM HARDWARE INFRASTRUCTURE FOR HOT PLUGGING MULTI-FUNCTION PCI CARDS WITH EMBEDDED BRIDGES" and assigned application Ser. No. 60/046,312. Page 1, line 7 of the provisional application has been changed from the original to positively recite that the entire provisional application, including the attached documents, forms part of this disclosure.

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The field of the invention relates to I/O adapters in computer systems. More particularly, the field of invention relates to the hot add and swap of adapters on a computer system.

2. Description of the Related Technology

As enterprise-class servers, which are central computers in a network that manage common data, become more powerful and more capable, they are also becoming ever more sophisticated and complex. For many companies, these changes lead to concerns over server reliability and manageability, particularly in light of the increasingly critical role of server-based applications. While in the past many systems administrators were comfortable with all of the various components that made up a standards-based network server, today's generation of servers can appear as an incomprehensible, unmanageable black box. Without visibility into the underlying behavior of the system, the administrator must "fly blind." Too often, the only indicators the network manager has on the relative health of a particular server is whether or not it is running.

It is well-acknowledged that there is a lack of reliability and availability of most standards-based servers. Server downtime, resulting either from hardware or software faults or from regular maintenance, continues to be a significant problem. By one estimate, the cost of downtime in mission critical environments has risen to an annual total of $4.0 billion for U.S. businesses, with the average downtime event resulting in a $140 thousand loss in the retail industry and a $450 thousand loss in the securities industry. It has been reported that companies lose as much as $250 thousand in employee productivity for every 1% of computer downtime. With emerging Internet, intranet and collaborative applications taking on more essential business roles every day, the cost of network server downtime will continue to spiral upward.

A significant component of cost is hiring administration personnel. These costs decline dramatically when computer systems can be managed using a common set of tools, and where they don't require immediate attention when a failure occurs. Where a computer system can continue to operate even when components fail, and defer repair until a later time, administration costs become more manageable and predictable.

While hardware fault tolerance is an important element of an overall high availability architecture, it is only one piece of the puzzle. Studies show that a significant percentage of network server downtime is caused by transient faults in the I/O subsystem. These faults may be due, for example, to the device driver, the device firmware, or hardware which does not properly handle concurrent errors, and often causes servers to crash or hang. The result is hours of downtime per failure, while a system administrator discovers the failure, takes some action, and manually reboots the server. In many cases, data volumes on hard disk drives become corrupt and must be repaired when the volume is mounted. A dismount-and-mount cycle may result from the lack of "hot pluggability" or "hot plug" in current standards-based servers. Hot plug refers to the addition and swapping of peripheral adapters to an operational computer system. Diagnosing intermittent errors can be a frustrating and time-consuming process. For a system to deliver consistently high availability, it must be resilient to these types of faults.

Existing systems also do not have an interface to control the changing or addition of an adapter. Since any user on a network could be using a particular adapter on the server, system administrators need a software application that will control the flow of communications to an adapter before, during, and after a hot plug operation on an adapter.

Current operating systems do not by themselves provide the support users need to hot add and swap an adapter. System users need software that will freeze and resume the communications of their adapters in a controlled fashion. The software needs to support the hot add of various peripheral adapters such as mass storage and network adapters. Additionally, the software should support adapters that are designed for various bus systems such as Peripheral Component Interconnect, CardBus, Microchannel, Industrial Standard Architecture (ISA), and Extended ISA (EISA). System users also need software to support the hot add and swap of canisters and multi-function adapter cards, which are plug-in cards having more than one adapter.

In a typical PC-based server, upon the failure of an adapter, which is a printed circuit board containing microchips, the server must be powered down, the new adapter and adapter driver installed, the server powered back up and the operating system reconfigured.

However, various entities have tried to implement the hot plug of these adapters to a fault tolerant computer system. One significant difficulty in designing a hot plug system is protecting the circuitry contained on the adapter from being short-circuited when an adapter is added to a powered system. Typically, an adapter contains edge connectors which are located on one side of the printed circuit board. These edge connectors allow power to transfer from the system bus to the adapter, as well as supplying data paths between the bus and the adapter. These edge connectors fit into a slot on the bus on the computer system. A traditional hardware solution for "hot plug" systems includes increasing the length of at least one ground contact of the adapter, so that the ground contact on the edge connector is the first connector to contact the bus on insertion of the I/O adapter and the last connector to contact the bus on removal of the adapter. An example of such a solution is described in U.S. Pat. No. 5,210,855 to Thomas M. Bartol.

U.S. Pat. No. 5,579,491 to Jeffries discloses an alternative solution to the hot installation of I/O adapters. Here, each hotly installable adapter is configured with a user actuable initiator to request the hot removal of an adapter. The I/O adapter is first physically connected to a bus on the computer system. Subsequent to such connection a user toggles a switch on the I/O adapter which sends a signal to the bus controller. The signal indicates to the bus controller that the user has added an I/O adapter. The bus controller then alerts the user through a light emitting diode (LED) whether the adapter can be installed on the bus.

However, the invention disclosed in the Jeffries patent also contains several limitations. It requires the physical modification of the adapter to be hotly installed. Another limitation is that the Jeffries patent does not teach the hot addition of new adapter controllers or bus systems. Moreover, the Jeffries patent requires that before an I/O adapter is removed, another I/O adapter must either be free and spare or free and redundant. Therefore, if there was no free adapter, hot removal of an adapter is impossible until the user added another adapter to the computer system.

A related technology, not to be confused with hot plug systems, is Plug and Play defined by Microsoft and PC product vendors. Plug and Play is an architecture that facilitates the integration of PC hardware adapters to systems. Plug and Play adapters are able to identify themselves to the computer system after the user installs the adapter on the bus. Plug and Play adapters are also able to identify the hardware resources that they need for operation. Once this information is supplied to the operating system, the operating system can load the adapter drivers for the adapter that the user had added while the system was in a non-powered state. Plug and Play is used by both Windows 95 and Windows NT to configure adapter cards at boot-time. Plug and Play is also used by Windows 95 to configure devices in a docking station when a hot notebook computer is inserted into or removed from a docking station.

Therefore, a need exists for improvements in server management which will result in continuous operation despite adapter failures. System users must be able to replace failed components, upgrade outdated components, and add new functionality, such as new network interfaces, disk interface adapters and storage, without impacting existing users. Additionally, system users need a process to hot add their legacy adapters, without purchasing new adapters that are specifically designed for hot plug. As system demands grow, organizations must frequently expand, or scale, their computing infrastructure, adding new processing power, memory, mass storage and network adapters. With demand for 24-hour access to critical, server-based information resources, planned system downtime for system service or expansion has become unacceptable.

SUMMARY OF THE INVENTION

Embodiments of the inventive software architecture allows users to replace failed components, upgrade outdated components, and add new functionality, such as new network interfaces, disk interface adapters and storage, without impacting existing users. The software architecture supports the hot add and swap of off-the-shelf adapters, including those adapters that are programmable.

One embodiment of the invention includes a computer capable of hot adding an adapter, comprising a computer including a memory, a plurality of I/O devices, a plurality of adapters connected to the computer, wherein one or more adapters control the I/O to selected ones of the I/O devices, and wherein the adapters are programmable and a configuration manager capable of programming a hot added adapter so that the hot added adapter can communicate with the computer.

Another embodiment of the invention includes computer capable of hot adding an adapter, comprising a memory, an I/O device, an adapter connected to the computer, wherein the adapter controls the I/O to the I/O device, and wherein the computer is capable of individually turning on and off the power to the adapter and a configuration manager capable of programming a hot added adapter so that the hot added adapter can communicate with the computer.

Yet another embodiment of the invention includes a computer capable of hot adding an adapter, comprising a memory, an I/O device, an adapter connected to the computer, wherein the adapter controls the I/O to the I/O device, and wherein the adapter is programmable and a configuration manager capable of programming a hot added adapter so that the hot added adapter can communicate with the computer.

DETAILED DESCRIPTION OF THE INVENTION

The following detailed description presents a description of certain specific embodiments of the present invention. However, the present invention can be embodied in a multitude of different ways as defined and covered by the claims. In this description, reference is made to the drawings wherein like parts are designated with like numerals throughout.

Figure 1:
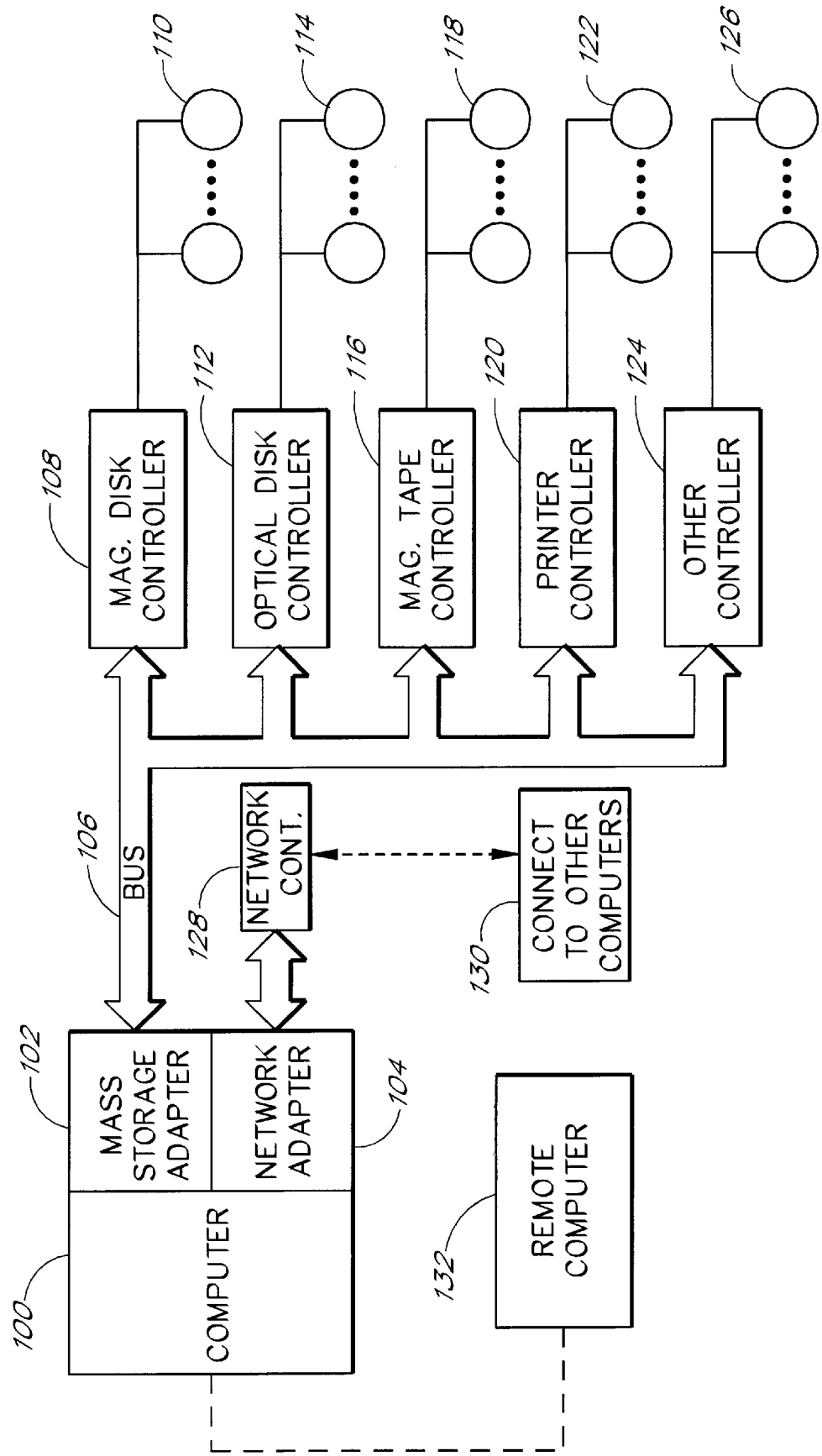
FIG. 1 is a top-level block diagram showing a fault tolerant computer system of one embodiment of the present invention, including a mass storage adapter and a network adapter.

FIG. 1 is a block diagram showing one embodiment of a fault tolerant computer system. Typically the computer system is one server in a network of servers and is communicating with client computers. Such a configuration of computers is often referred to as a client-server architecture. A fault tolerant server is useful for mission critical applications such as the securities business where any computer down time can result in catastrophic financial consequences. A fault tolerant computer will allow for a fault to be isolated and not propagate through the system thus providing complete or minimal disruption to continuing operation. Fault tolerant systems also provide redundant components, such as adapters, so service can continue even when one component fails.

The system includes a fault tolerant computer system 100 connecting to a mass storage adapter 102 and a network adapter 104 such as for use in a Local Area Network (LAN). The mass storage adapter 102 may contain one or more of various types of device controllers: a magnetic disk controller 108 for magnetic disks 110, an optical disk controller 112 for optical disks 114, a magnetic tape controller 116 for magnetic tapes 118, a printer controller 120 for various printers 122, and any other type of controller 124 for other devices 126. For such multi-function adapters, the controllers may be connected by a bus 106 such as a PCI bus. The peripheral devices communicate and are connected to each controller, by a mass storage bus. In one embodiment, the bus may be a Small Computer System Interface (SCSI) bus. In a typical server configuration there is more than one mass storage adapter connected to the computer 100. Adapters and I/O devices are off-the-shelf products. For instance, sample vendors for a magnetic disk controller 108 and magnetic disks 110 include Qlogic, Intel, and Adaptec. Each magnetic hard disk may hold multiple Gigabytes of data.

The network adapter 104 typically includes a network controller 128. The network adapter 104, which is sometimes referred to as a network interface card (NIC), allows digital communication between the fault tolerant computer system 100 and other computers (not shown) such as a network of servers via a connection 130. In certain configurations there may be more than one network controller adapter connected to the computer 100. For LAN embodiments of the network adapter, the protocol used may be, for example, Ethernet (IEEE 802.3), Token Ring (IEEE 802.5), Fiber Distributed Datalink Interface (FDDI), Asynchronous Transfer Mode (ATM) or any other conventional protocol. Typically, the mass storage adapter 102 and the network adapter 104 are connected to the computer using a standards-based bus system. In different embodiments of the present invention, the standards based bus system could be Peripheral Component Interconnect (PCI), Microchannel, SCSI, Industrial Standard Architecture (ISA) and Extended ISA (EISA) architectures.

Figure 2:
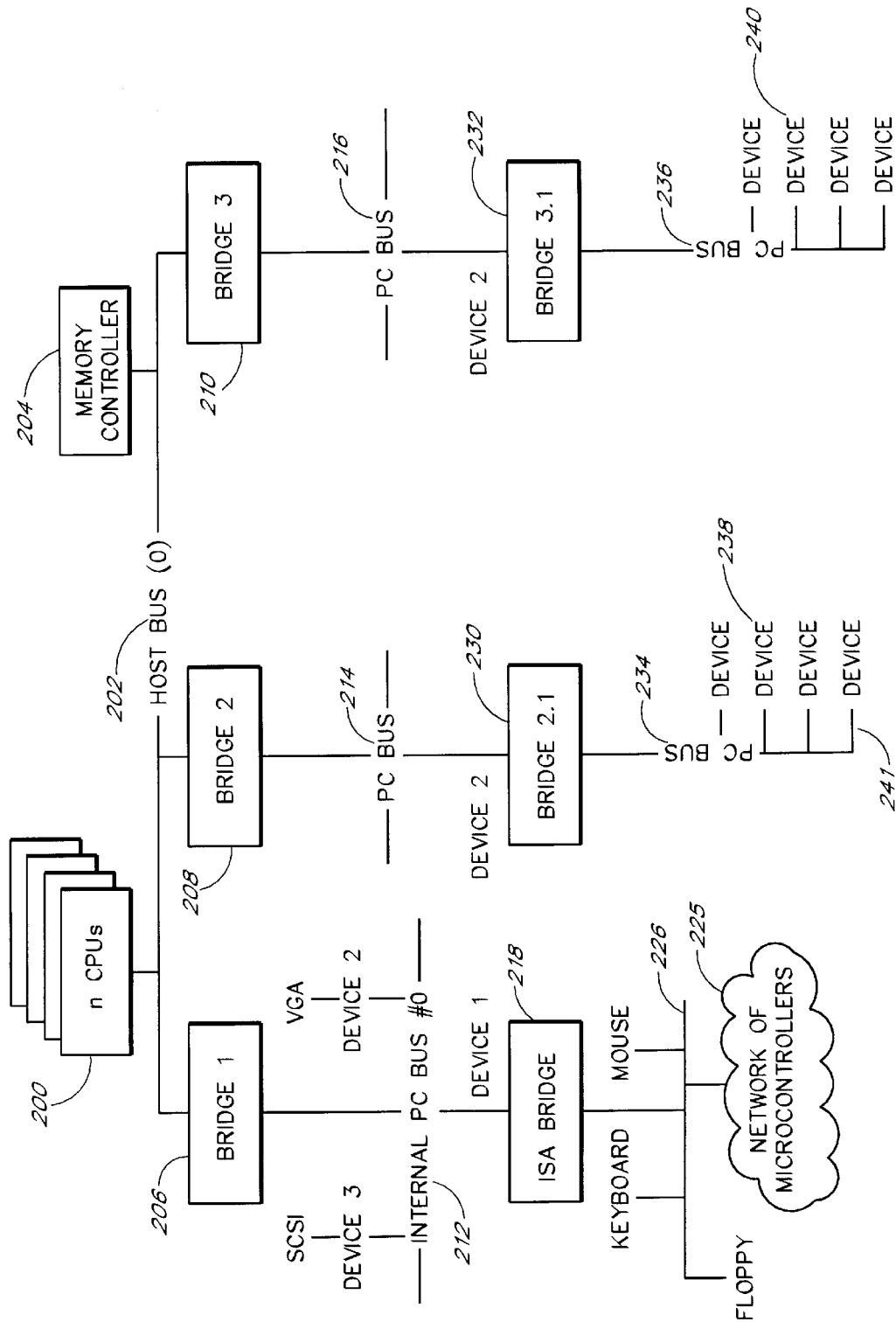
FIG. 2 is a block diagram showing a first embodiment of a multiple bus configuration connecting I/O adapters and a network of microcontrollers to the clustered CPUs of the fault tolerant computer system, shown in FIG. 1.

FIG. 2 shows one embodiment of the bus structure of the fault tolerant computer system 100. A number 'n' of central processing units (CPUs) 200 are connected through a host bus 202 to a memory controller 204, which allows for access to memory by the other system components. In one embodiment, there are four CPUs 200, each being an Intel Pentium Pro microprocessor. However, many other general purpose or special purpose parts and circuits could be used. A number of bridges 206, 208 and 209 connect the host bus to, respectively, three high speed I/O bus systems 212, 214, and 216. The bus systems 212, 214 and 216, referred to as PC buses, may be any standards-based bus system such as PCI, ISA, EISA and Microchannel. In one embodiment of the invention, the bus system 212 is PCI. Alternative embodiments of the invention employ a proprietary bus. An ISA Bridge 218 is connected to the bus system 212 to support legacy devices such as a keyboard, one or more floppy disk drives and a mouse. A network of microcontrollers 225 is also interfaced to the ISA bus 226 to monitor and diagnose the environmental health of the fault tolerant system. A more detailed description of the microcontroller network 225 is contained in the U.S. patent application Ser. No. 09/915,959 for "Diagnostic and Managing Distributed Processor System," to Johnson.

A bridge 230 and a bridge 232 connects, respectively, the PC bus 214 with PC bus 234 and the PC bus 216 with the PC bus 236 to provide expansion slots for peripheral devices or adapters. Separating the devices 238 and 240, respectively, on PC buses 234 and 236 reduces the potential that an adapter failure or other transient I/O error affect the entire bus and corrupt data, bring the entire system down or stop the system administrator from communicating with the system. The adapter devices 238 and 240 are electrically and mechanically connected to the PC buses 234 and 236 by PC slots such as slot 241. Hence, an adapter is "plugged" into a slot. In one embodiment of the invention, each slot may be independently powered on and off.

Figure 3:
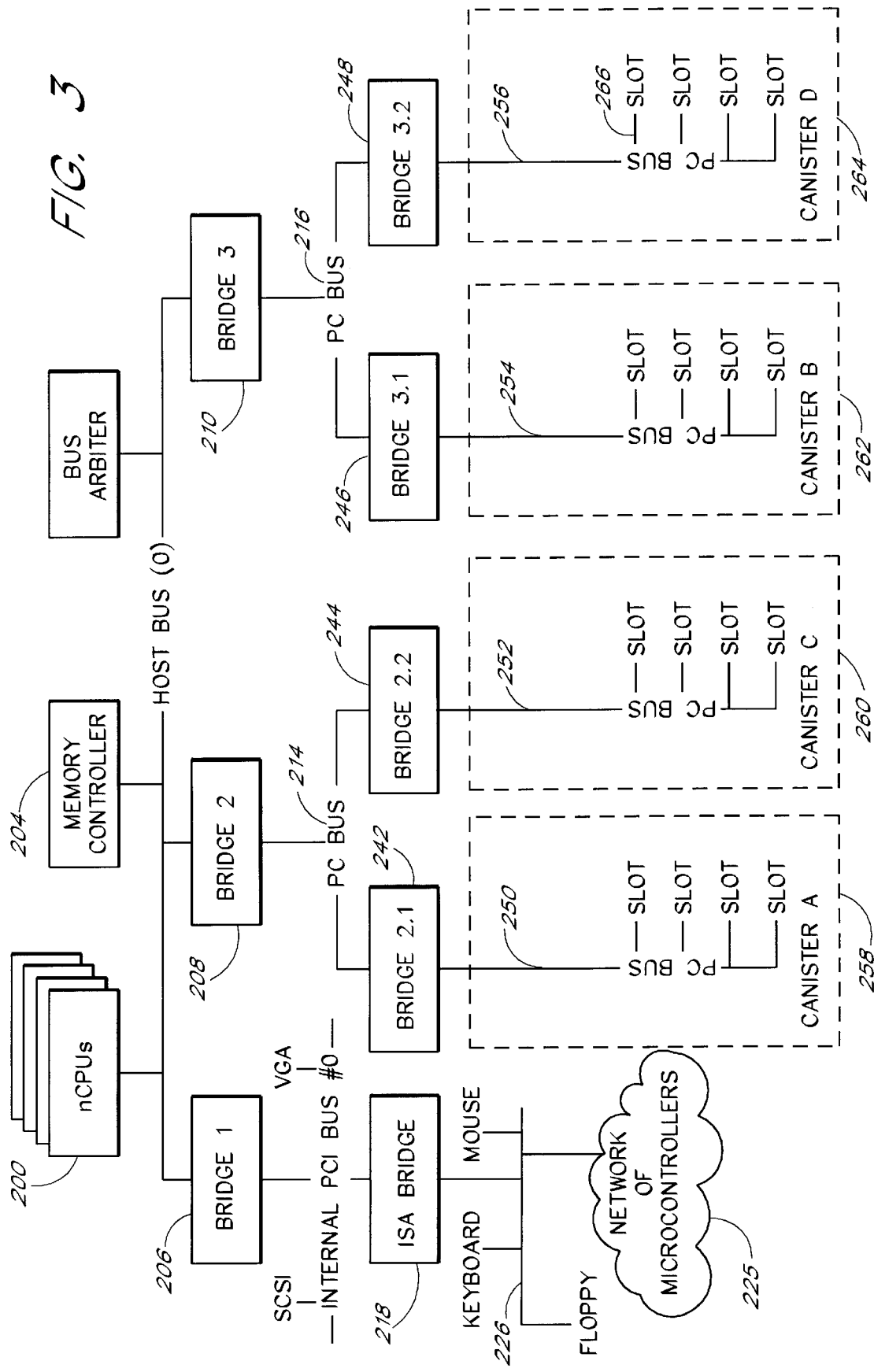
FIG. 3 is a block diagram showing a second embodiment of a multiple bus configuration connecting canisters containing I/O adapters and a network of microcontrollers to the clustered CPUs of the fault tolerant computer system, shown in FIG. 1.

FIG. 3 shows an alternative bus structure embodiment of the fault tolerant computer system 100. The two PC buses 214 and 216 contain a set of bridges 242–248 to a set of PC bus systems 250–256. As with the PC buses 214 and 216, the PC buses 250–256 can be designed according to any type of bus architecture including PCI, ISA, EISA, and Microchannel. The PC buses 250–256 are connected, respectively, to a canister 258, 260, 262 and 264. The canisters 258–264 are casings for a detachable bus system and provide multiple PC slots 266 for adapters. In one embodiment, each canister may be independently powered on and off.

Figure 4:
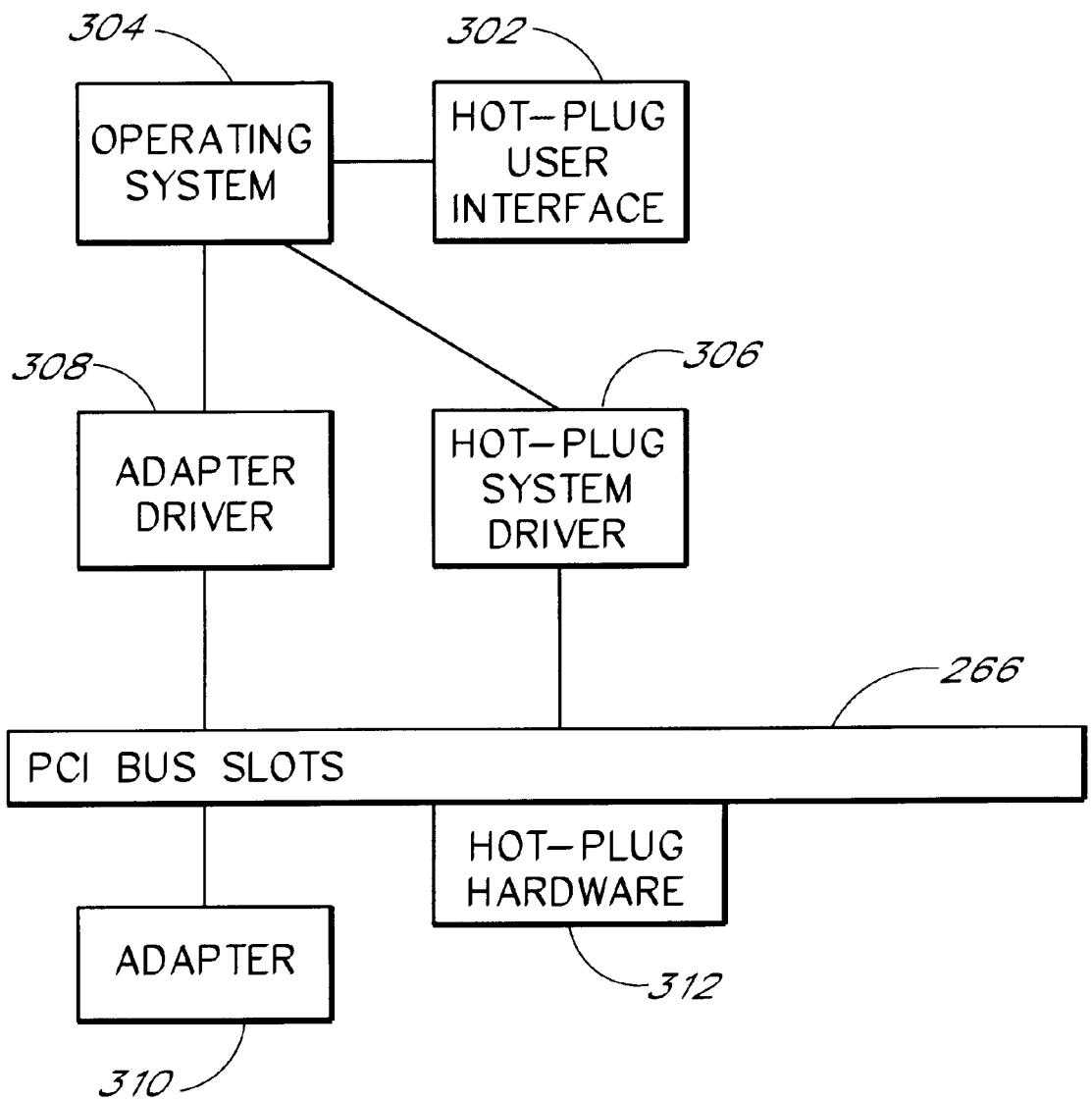
FIG. 4 is a block diagram illustrating a portion of the fault tolerant computer system, shown in FIG. 1.

FIG. 4 is a block diagram illustrating hardware and software components of the computer system 100 relating to hot plugging an adapter. A hot plug user interface 302 accepts requests by a user such as a system manager or administrator to perform the hot add or a hot swap of an adapter 310. The user interface 302 preferably communicates through an industry standard operating system 304 such as Windows NT or NetWare, to the hot plug system driver 306 and an adapter driver 308. In an alternative embodiment of the invention, a proprietary operating system may be utilized.

The hot plug system driver 306 controls the adapter driver 308 for a hot plug operation. The hot plug system driver 306 stops and resumes the communications between the adapter 310 and the adapter driver 308. During a hot add or swap of the adapter 310, the hot plug hardware 312 deactivates the power to the PC slots 241 and 266 (FIGS. 2 and 3). One embodiment of the hot plug hardware 312 may include the network of microcontrollers 225 (FIGS. 2 and 3) to carry out this functionality.

The adapter 310 could be any type of peripheral device such as a network adapter, a mass storage adapter, or a sound board. Typically, however, adapters involved in providing service to client computers over a network, such as mass storage, network and communications adapters, would be the primary candidates for hot swapping or adding in a fault tolerant computer system such as the computer system 100 (FIG. 1). The adapter 310 is physically connected to the hot plug hardware by PC slots such as slots 241 and 266 (FIGS. 2 and 3).

Figure 6:
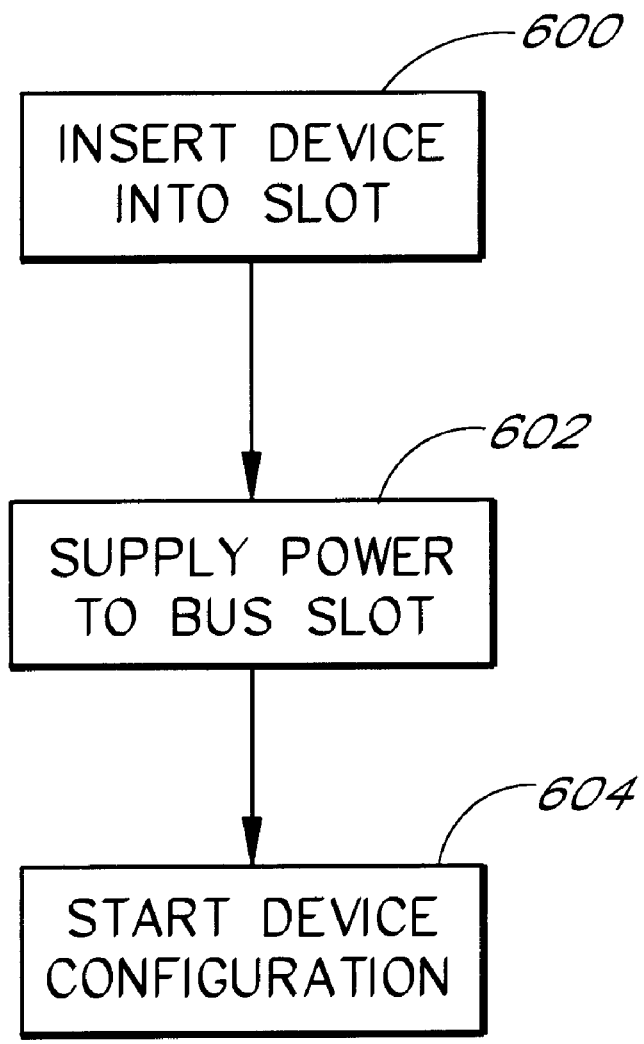
FIG. 6 is one embodiment of a flowchart illustrating the process by which a user performs a hot add of an adapter in the fault tolerant computer system, shown in FIG. 2.
Figure 7:
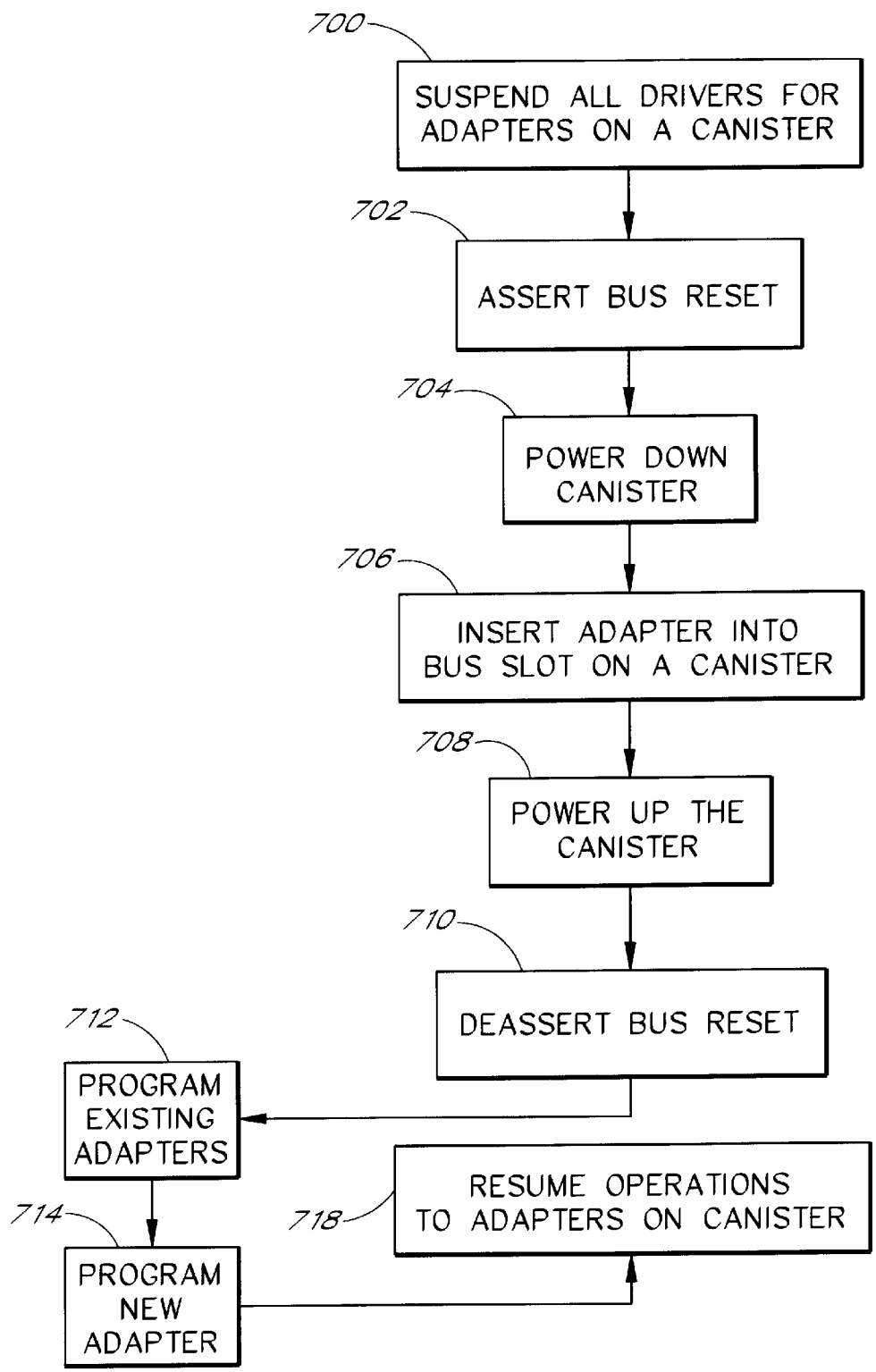
FIG. 7 is one embodiment of a flowchart showing the process by which a user performs a hot add of an adapter on a canister on a fault tolerant computer system, shown in FIG. 3.
Figure 8:
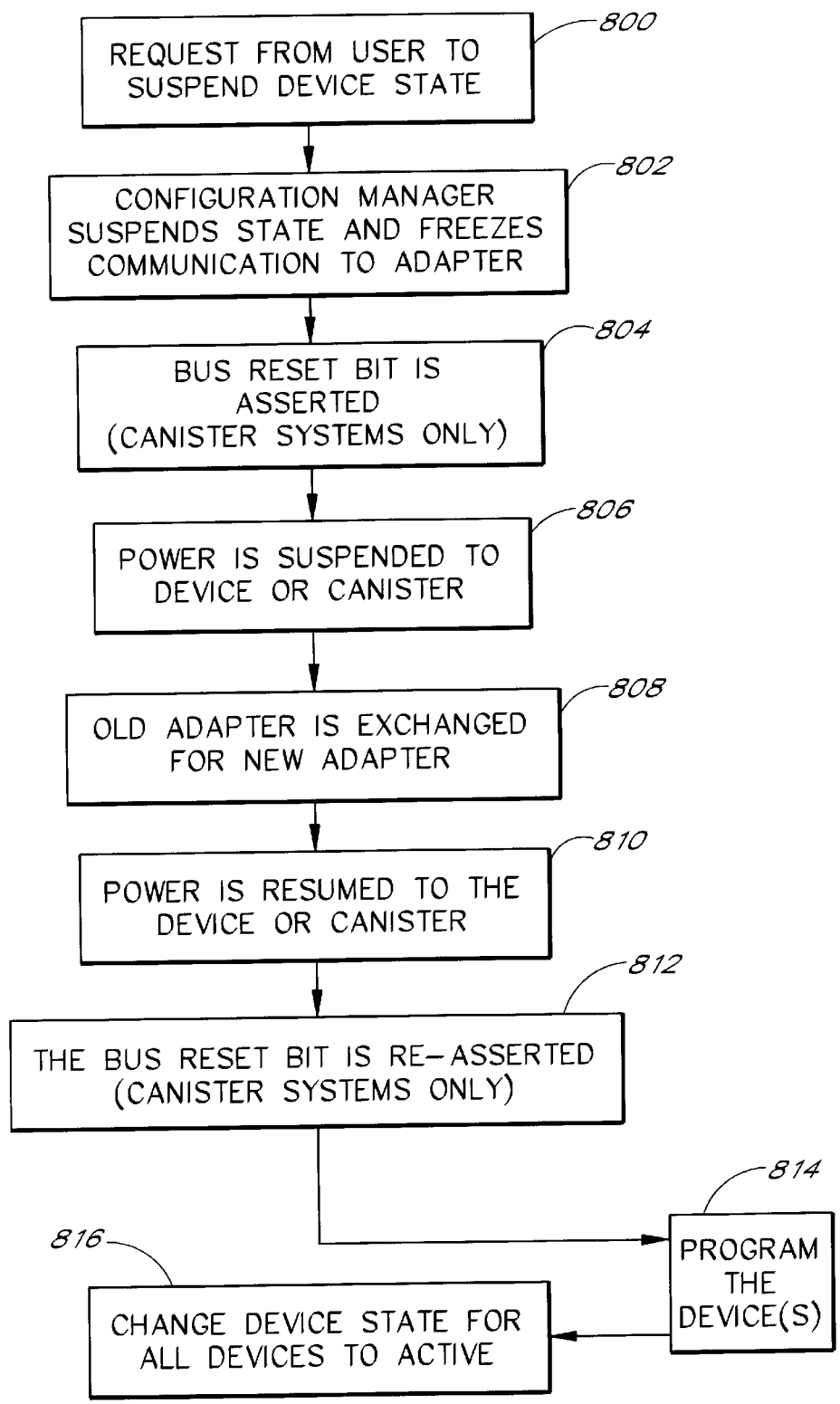
FIG. 8 is one embodiment of a flowchart showing the process by which a user performs a hot swap of an adapter on a fault tolerant computer system, shown in FIGS. 2 and 3.

FIGS. 6, 7, and 8 illustrate a generic process by which alternative embodiments of the present invention perform the hot add and swap of devices. Some embodiments of the invention use commercial operating systems, such as Macintosh O.S., OS/2, VMS, DOS, Windows 3.1/95/98 or UNIX to support hot add and swap.

In alternative embodiments of the invention, the hot plug system executes on an I/O platform. In a first architectural embodiment of the invention, the I/O platform and its devices plug in as a single adapter card into a slot. In a second architectural embodiment of the invention, the bridge is integrated onto the motherboard, and hot plug adapters plug in behind the bridge. In a third architectural embodiment of the invention, the I/O platform is plugged in as an option to control non-intelligent devices as are recognized by skilled technologists.

In the second architectural embodiment, the I/O platform can be any industry standard I/O board such as, for example, the IQ80960RP Evaluation Board which is executing the Ix Works operating system by WindRiver Systems, Inc. In the second architectural embodiment, a hardware device module (HDM) or adapter driver executes on the motherboard. The HDM is designed to communicate via messages with any type of operating system executing on the computer. These messages correspond to primitives which allow hot add and hot swap of adapters plugged into the motherboard.

The following sections describe embodiments of the invention operating on the computers shown in FIGS. 2 and 3 under NetWare Operating System and Windows NT. As previously mentioned, FIGS. 6, 7, and 8 illustrate a generic process by which alternative embodiments of the present invention perform the hot add and swap of devices. First, a process for hot add and swap of an adapter under the NetWare Operating System will be described according to the processes shown in FIGS. 6, 7 and 8. Second, a process for hot add and swap of an adapter 310 under the Windows NT Operating System environment will be described according to the processes shown in FIGS. 6, 7, and 8.

Adapter Hot Plug with NetWare Operating System

Figure 5:
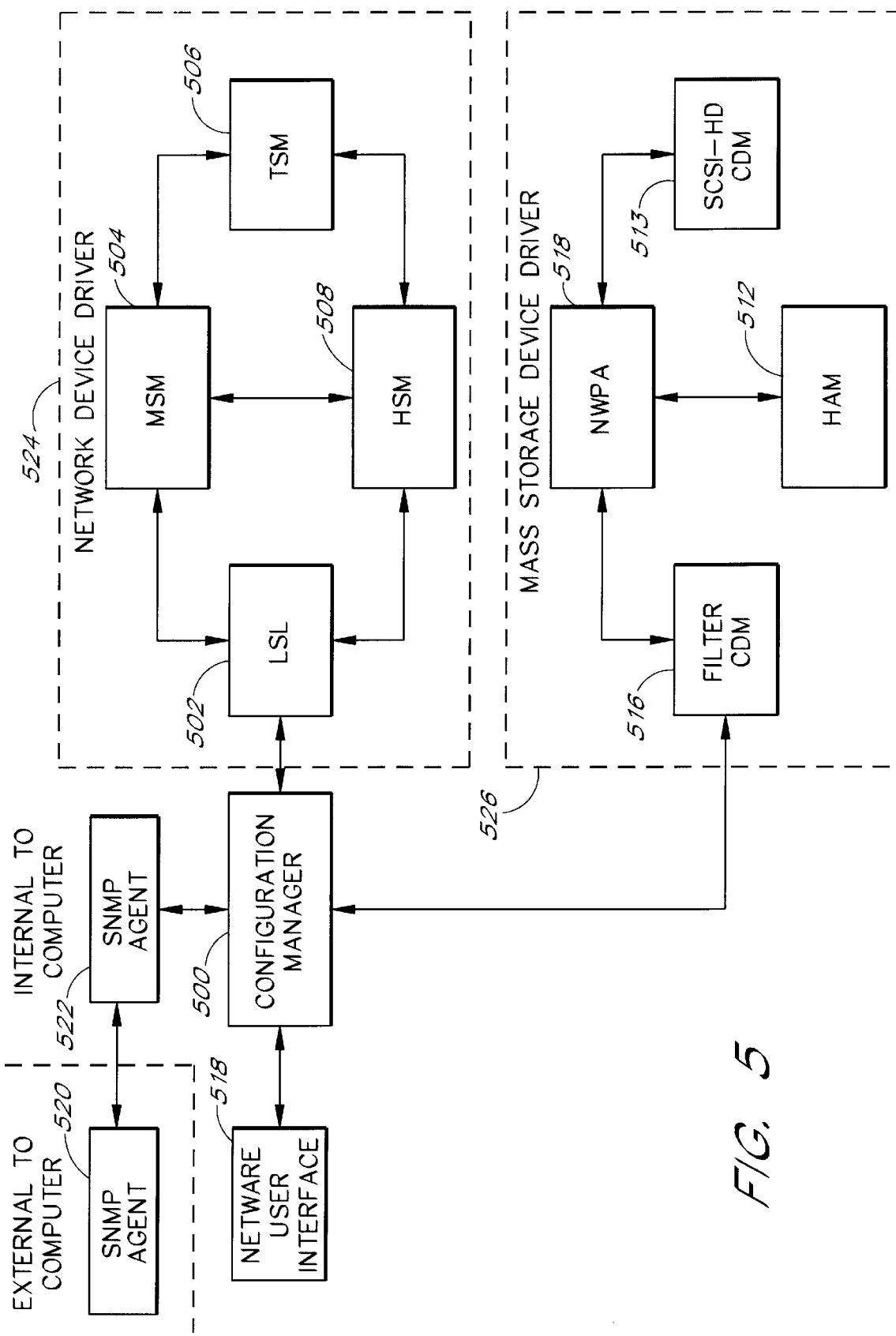
FIG. 5 is a block diagram illustrating certain device driver components of the NetWare Operating System and one embodiment of a configuration manager which reside on the fault tolerant computer system, shown in FIG. 1.

FIG. 5 is a block diagram illustrating the system components of the NetWare Operating System and an embodiment of the software components of the invention. A configuration manager 500 is responsible for managing all or some of the adapters on the PC buses 234 and 236 (FIG. 2), or 250, 252, 254 and 256 (FIG. 3). The configuration manager 500 keeps track of the configuration information for every managed adapter located on the fault tolerant computer system 100. The configuration manager 500 also allocates resources for every managed adapter and initializes each managed adapter's registers during a hot swap operation. The registers of an adapter 310 are components or intermediate memories whose values issues a certain action in the adapter, or whose values indicate the status of the adapter.

Novell has created two interfaces for adapter drivers to communicate with the NetWare Operating Systems (FIGS. 1 and 4). First, Novell has provided the Open Datalink Interface (ODI) for network drivers. Second, Novell has created the NetWare Peripheral Architecture (NWPA) for mass storage adapters. Each of these interfaces will be described below.

With respect to network device drivers, such as a driver 524, ODI was created to allow multiple LAN adapters, such as the adapter 104 to co-exist on network systems, and to facilitate the task of writing device driver software. The ODI specification describes the set of interface (FIG. 1) and software modules used by hardware vendors to interface with the NetWare operating system. At the core of the ODI is the link support layer (LSL) 502. The LSL 502 is the interface between drivers and protocol stacks (not shown). Any LAN driver written to ODI specifications can communicate with any ODI protocol stack via the LSL 502. A protocol stack is a layered communication architecture, whereby each layer has a well defined interface.

Novell has provided a set of support modules that creates the interface to the LSL 502. These modules are a collection of procedures, macros and structures. These modules are the media support module (MSM) 504 which contains general functions common to all drivers and the topology specific modules (TSM) 506. The TSM 506 provides support for the standardized media types of token ring, Fiber Distributed Datalink Interface (FDDI) and Ethernet. The MSM 504 manages the details of interfacing ODI multi-link interface drivers (MLID) to the LSL 502 and the NetWare Operating System. The MSM 504 typically handles all of the generic initialization and run-time issues common to all drivers. The topology specific module or TSM 506 manages operations that are unique to a specific media type. The Hardware Specific Modules (HSM) are created by each adapter vendor for each type of adapter 308. The HSM 508 contains the functionality to initialize, reset and shutdown the adapter 308. The HSM 508 also handles packet transmission and reception to and from each adapter 308.

With respect to mass storage device drivers, such as a driver 526, the NetWare Peripheral Architecture (NWPA) 510 is a software architecture developed by Novell which provides an interface for mass storage developers to interface with the NetWare operating system. The NWPA 510 is divided into two components: a host adapter module (HAM) 512 and a custom device module (CDM) 513. The HAM 512 is a component that contains information on the host adapter hardware which is typically written by a mass storage adapter vendor. The CDM 513 is the component of the NWPA 510 that regulates the mass storage adapters 102.

The main purpose of the Filter CDM 516 is to locate each HAM 512, register adapter events, and process the I/O suspend and I/O restart requests from the configuration manager 500. These commands will be discussed in greater detail below with reference to FIG. 10.

A NetWare user interface 518 initiates the requests to the configuration manager 500 to freeze and restart communications to a specified adapter 310. A remote Simple Network Management Protocol (SNMP) agent 520 can also start the request to freeze and resume communications to the configuration manager 500 through a local SNMP agent 522. SNMP is one of a set of protocols called TCP/IP, which is specifically designed for use in managing computer systems. In one embodiment of the invention, the computers would be similar to the fault tolerant computer system of FIG. 1 and connected in a server network via connection 130.

FIG. 6 is a flowchart illustrating one embodiment of the process to hot add an adapter 310. For instance, the process shown in FIG. 6 may be utilized by a fault tolerant computer system 100 containing the bus structure shown in FIG. 2. The process described by FIG. 6 is generic to various implementations of the invention. The following description of FIG. 6 focuses on the hot add of an adapter 310 (FIG. 4) under the NetWare Operating System.

Starting in state 600, a user inserts an adapter 310 into one of the PC bus slots, such as the slot 241. At this point, the hot plug hardware 312 has not turned on the power to the adapter's slot, although the fault tolerant computer system 100 is operational. Since the adapter's slot is not powered and is physically isolated from any other devices which are attached to the bus 234, the adapter will not be damaged by a short circuit during the insertion process, and will not create problems for the normal operation of the fault tolerant computer system 100. Moving to state 602, the configuration manager 500 is notified that the adapter is now in the slot, and requests the hot plug hardware 312 to supply power to the adapter's slot. In one embodiment of the invention, the hot plug hardware automatically detects the presence of the newly added adapter 310 and informs the configuration manager 500. In another embodiment of the invention, the user notifies the hot plug hardware 312 that the adapter 310 is connected to one of the PC slots 241. The process by which a slot 241 and adapter 238 are powered on and attached to a shared bus 234 is described in the U.S. application Ser. No. 09/915,959, for "Diagnostic and Managing Distributed Processor System," to Johnson.

Once an adapter 310 is added to the computer system, system resources must be allocated for the adapter 310. The configuration manager 500 then configures the newly added adapter 310 (state 604) by writing information to the adapter's configuration space registers.

Traditionally, an adapter's resources are allocated by the Basic Input Output Services (BIOS). The BIOS are service routines which are invoked during the fault tolerant computers system's 100 start up phase. The BIOS programs the I/O ports, or memory locations of each adapter on the fault tolerant computer system 100. However, since any newly added adapter was not present during the execution of the BIOS initialization routines, the configuration manager 500 must configure the new adapter in the same manner that another like adapter is programmed by the BIOS. The process by which the configuration space of an a newly added adapter 310 is configured is described in the U.S. application Ser. No. 09/915,959, "Diagnostic and Managing Distributed Processor System" to Johnson.

FIG. 7 is a flowchart illustrating the process hot add an adapter 310 on one of the canisters 258–264. The process described by FIG. 7 is generic to multiple embodiments of the invention. For instance, the process shown in FIG. 7 is utilized by a fault tolerant computer system 100 containing the bus structure shown in FIG. 3. The following description of FIG. 7 focuses on the hot add of an adapter 310 on a canister under the NetWare Operating System.

Starting in state 700, all devices already operating in the selected canister are located, and activity involving those adapters is suspended. In one embodiment, the SNMP agent 520 or the NetWare User Interface 518 locates all devices, and initiates the request for the suspension for every adapter, such as the adapter 310, on the canister. The configuration manager 500 suspends the I/O for every adapter that is located on the canister which was selected by the user to receive the new card. In another embodiment, the SNMP agent 520 or the NetWare User Interface 518 requests the configuration manager to suspend the canister. The configuration manager 500 then locates all devices and suspends the I/O for each adapter located on the selected canister.

Figure 9:
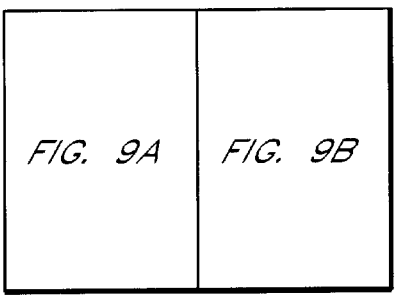
FIGS. 9A and 9B are flowcharts showing one process by which the configuration manager may suspend and restart I/O for hot swapping network adapters under the NetWare Operating System, shown in FIG. 8.

The configuration manager 500 initiates the suspension of I/O to either the NWPA 510 for the mass storage adapters 102 or the LSL 502 and MSM 504 for the network adapter 104. FIGS. 9 and 10, described below, illustrate in detail the process by which the configuration manager 500 suspends and resumes the I/O to a mass storage adapter and to a network adapter.

For the embodiments of the invention that use PCI, the bus must be quiesced, and power to the canister turned off. In one embodiment, the software must assert the bus reset bit as defined by the PCI specification (state 702). If the power to the canister is on, the hot plug hardware 312 is directed by the configuration manager 500 to disable the power to one of the specified canisters 258–264 (state 704). In another embodiment, the hot plug hardware 312 asserts bus reset, then powers the canister down.

Proceeding to state 706, the user removes the selected canister, e.g., canister 264, and inserts an adapter into one of the PC slots 266. If the card is on a new canister that was not present during boot initialization, the hot plug hardware 312 should support the sparse assignment of bus numbers for those systems that require such functionality. The user then returns the canister to the fault tolerant computer system 100. The hot plug hardware 312 then restarts, at the request of the configuration manager 500, the power to the selected canister (state 708). For PCI systems, the bus reset bit must be de-asserted (state 710). In one embodiment of the invention, this de-assertion is accomplished by the hot plug hardware. In another embodiment, the configuration manager 500 de-asserts the bus reset. The configuration manager 500 re-initializes the configuration space of each adapter that was previously in the system (state 712). Since an adapter has lost power during a hot add, the adapter is in an unknown state after reapplying power. Moving to state 714, the configuration manager 500 programs the configuration space of the new adapter. Finally, the configuration manager 500 resumes operations to all of the adapters located on the canister (state 718). For mass storage adapters 102, the configuration manager 500 notifies the NWPA 510 to resume communications. For network adapters 104, the configuration manager 500 contacts the LSL 502 to resume communications. In some embodiments of the invention, the configuration manager 500 restarts I/O to all adapters in the canister, per such a request, while in other embodiments, the user interface 518 or SNMP agent 520 requests the configuration manger 500 to restart each adapter.

FIG. 8 is a flowchart illustrating the process by which a user performs the hot swap of an adapter. The process described by FIG. 8 is generic to various implementations of the invention. For instance, the process shown in FIG. 8 may be utilized by a fault tolerant computer system 100 shown in FIGS. 2 and 3. The following description of FIG. 8 focuses on the hot swap of an adapter 310 under the NetWare Operating System.

Before starting in state 800, an event has occurred, such as a failure of an adapter, and the operator has been informed of the failure. The operator has procured a replacement part, and is determined to repair the computer system 100 at this time. The operator may have some other reason for deciding to remove and replace a card, such as upgrading to a new version of the card or its firmware. A user indicates his intention to swap an adapter through the NetWare user interface 518 or a remote SNMP agent 520 (FIG. 5).

For the embodiment of the computer shown in FIG. 2, the configuration manager 500 suspends the communication between the adapter, which is to be swapped, and the adapter driver 308 (state 802). For the embodiment of the computer shown in FIG. 3, the configuration manager 500 freezes the communication to each adapter located on the same canister as the adapter to be swapped. FIGS. 9 and 10, described below, illustrate the process by which the communication is suspended and restarted for, respectively, a mass storage adapter and a network adapter.

Next, in some embodiments, the hot plug hardware 318 asserts bus reset, if necessary, before removing power (state 804). In other embodiments, the configuration manager 500 specifically causes bus reset to be asserted before directing the hot plug hardware 318 to remove power. For embodiments of the computer shown in FIG. 2, the hot plug hardware 318 is then directed by the configuration manager 500 to suspend the power to the slot (state 806). For embodiments of the computer shown in FIG. 3, the hot plug hardware 318 is directed by the configuration manager 500 to suspend the power to adapter's canister (state 806).

Proceeding to state 808, for a canister system, the user removes the canister containing the failed card and exchanges an old adapter with a new adapter. The user then reinserts the canister. For a non-canister system, the user swaps the old adapter for the new adapter in the slot.

For canister systems with a PCI bus, at state 810, the hot plug hardware 318 reapplies power to the slot or the canister. For some embodiments, the hot plug hardware 312 also removes bus reset, if necessary, after applying power (state 812). In other embodiments, the configuration manager 500 must specifically de-assert the bus reset. For the embodiment of the computer shown by FIG. 2, the configuration manager 500 reprograms the configuration space of the replaced adapter to the same configuration as the old adapter (state 814). For the embodiment of the computer shown in FIG. 3, the configuration manager 500 reprograms the configuration space and resumes the communication of each adapter located on the canister on which the adapter was swapped (state 814). Finally in state 816 the configuration manager changes each adapter's state to active.

Figure 9A:
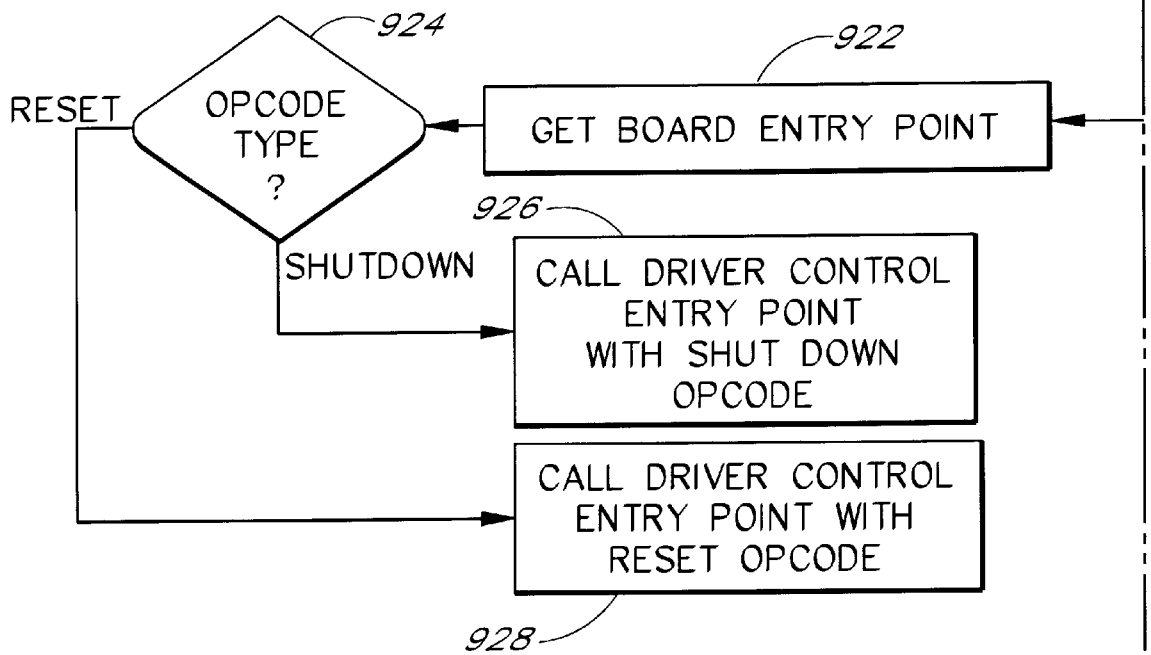
Figure 9B:
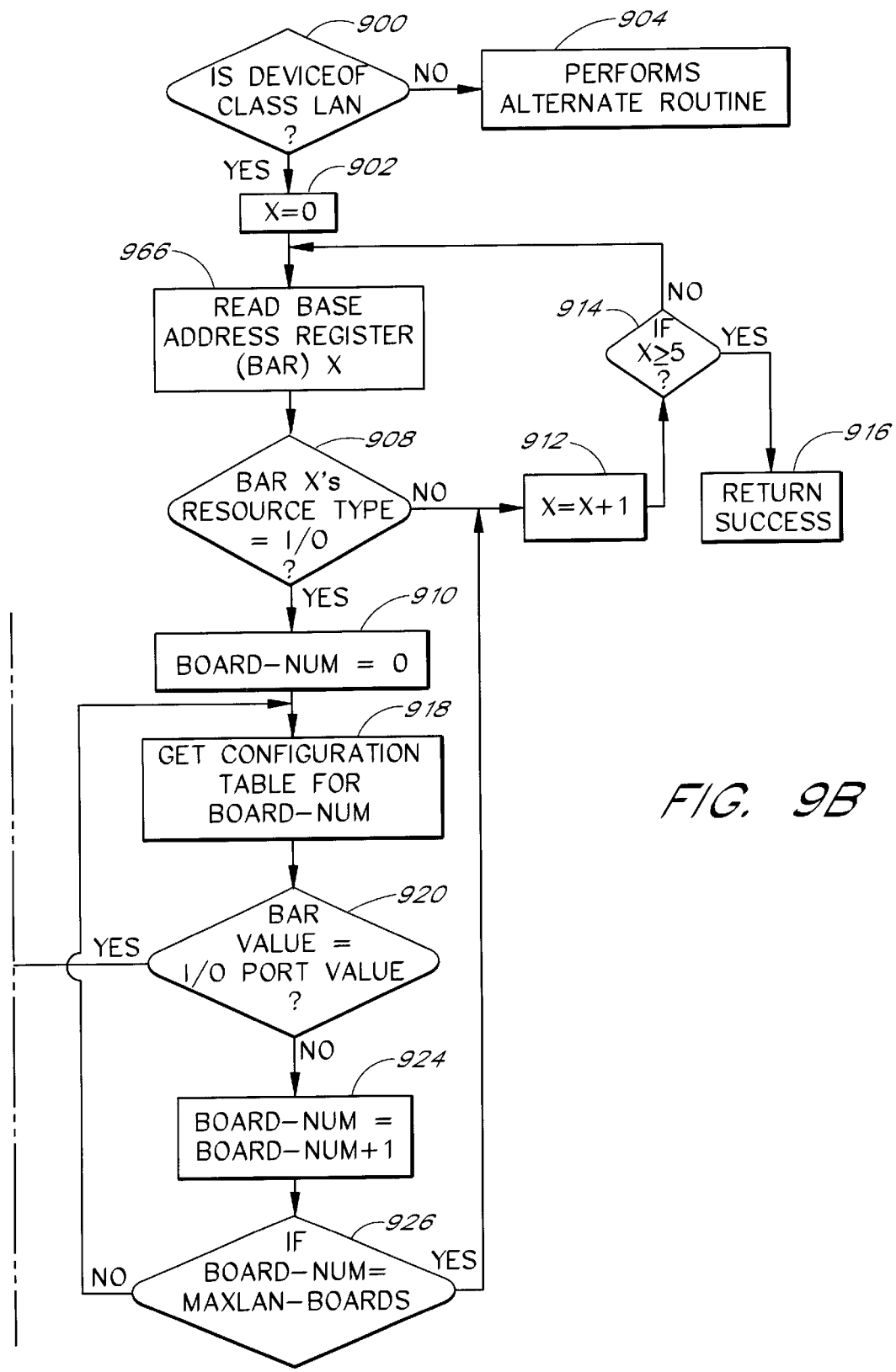

FIGS. 9A and 9B illustrate the process by which the configuration manager 500 suspends and restarts the communication of a network adapter, such as the adapter 104. The configuration manager 500 maintains information about the configuration space for each of the adapters maintained on the system. However, the configuration manager 500 does not know the logical number that the NetWare Operating System has assigned to each adapter. The configuration manager 500 needs the logical number of the adapter to direct the NetWare Operating System to shutdown a particular adapter. FIGS. 9A and 9B illustrate one embodiment of process of how the configuration manager 500 obtains the logical number of an adapter.

Starting in a decision state 900 in FIG. 9A, the configuration manager 500 checks whether the adapter's class is of the type "LAN" (or network). For PCI systems, each adapter maintains information in its PCI configuration space indicating its class. If the configuration manager 500 identifies an adapter as being of the LAN class, the configuration manager 500 proceeds to state 902. Otherwise, the configuration manager performs an alternative routine to handle the request to suspend or restart I/O communications (state 904). For example, if the class of the adapter 310 were of type "SCSI" (or mass storage), the configuration manager 500 would follow the process described in FIG. 10 for freezing the communication for a mass storage adapter 102.

As defined by the PCI specification, the base address registers (BARs) define the starting point of the I/O and memory addresses that each adapter has been allocated in system memory. Also, defined by the PCI specification, an adapter can have up to six BARs. It is up to the adapter vendor to implement one or more BARS in the adapter for I/O or memory addressing, as desired. According to the PCI specification, each of the six BAR entries in an adapter's configuration space is identified as to its resource type (bit zero indicates whether this BAR describes a memory space or I/O space).

The configuration manager 500 reads all of the BARs in the configuration space for each adapter 310, looking for a BAR which describes I/O resources. For each such BAR, the LSL 502 configuration spaces are searched for an I/O port address which matches this BAR. This process continues until a match is found, identifying the LSL 502 configuration space which describes this adapter. If no match is found, then LSL 502 has no logical board describing this adapter, and no driver exists to service this board.

At state 902, the variable "x" is initialized to zero. The xth BAR is examined to see if it is an I/O class address (states 906 and 908). If the BAR is not an I/O address, x is incremented (state 912), and a check is made whether all BARs have been examined (state 914). If all six BARs have now been examined (state 914), a status is returned by the configuration manager 500 indicating "driver not loaded". Otherwise, the configuration manager 500 returns to state 908 to examine the next BAR.

Referring to the state 910, the configuration manager 500 assigns the variable "board_num" the value of zero. The configuration manager 500 uses the variable "board_num" when requesting information from the NetWare Operating System driver configuration tables. A driver configuration table describes what NetWare knows about a particular driver and the driver's adapter. At state 918, the configuration manager 500 calls the NetWare Operating System to request the configuration table of the "board_num" logical slot. The NetWare Operating Systems call to retrieve configuration table information is GetMLIDConfigurationTableEntry( ).

If the configuration manager 500 call to GetMLIDConfigurationTableEntry( ) returns a configuration table, the configuration manager 500 compares the values of IOPort0 and IOPort1 fields of the configuration table, to the address located in the xth I/O BAR (state 908). If no match is found, the configuration manager 500 increments the board_num (state 924) and checks to see if any boards remain to be checked (state 926). If boards remain to be checked, the configuration manager proceeds back to state 918. Otherwise, if all the boards have been checked, the configuration manager 500 proceeds to look for the next BAR (state 912). Maxlan-boards is a variable maintained by the NetWare Operating System indicating the maximum number of logical network adapters supported.

If the BAR has a value equal to IOPort0 or IOPort1, the current configuration table describes the requested adapter and the process proceeds to state 922. The configuration manager 500 has at this point identified the logical board number of the adapter that the configuration manager 500 needs to shut down (state 922). The configuration manager 500 makes the NetWare Operating System call LSLGetMLIDControlEntry( ) to find an entry point into the adapter driver 308. As part of the system call, the configuration manager 500 passes the logical board number as a parameter. The LSLGetMLIDControlEntry( ) system call returns a pointer to the DriverControl( ) entry point for the requested board. The DriverControl( ) entry to the HSM provides a means to quiesce or remove an instance of the driver. At a decision state 924, the configuration manager 500 determines whether the user has requested a driver suspend or resume. If the user has requested driver suspend, the configuration manager 500 calls the DriverControlo entry point with the operation code '5'(shutdown) requesting a temporary shutdown. The MSM 504 does not remove the adapter driver 308 from the memory, but leaves it in place and preserves its current state. The HSM 508 receives this call and shuts down all communication to the adapter. Otherwise, if the user has requested a driver resume, the configuration manager 500 calls DriverControlo entry point with the operation code '6'(reset) state 928. The HSM 508 receives this call and resets the adapter 310. For both suspend and restart, the driver then proceeds to state 930 which returns a success message to the SNMP agent or NetWare user interface.

Figure 10A:
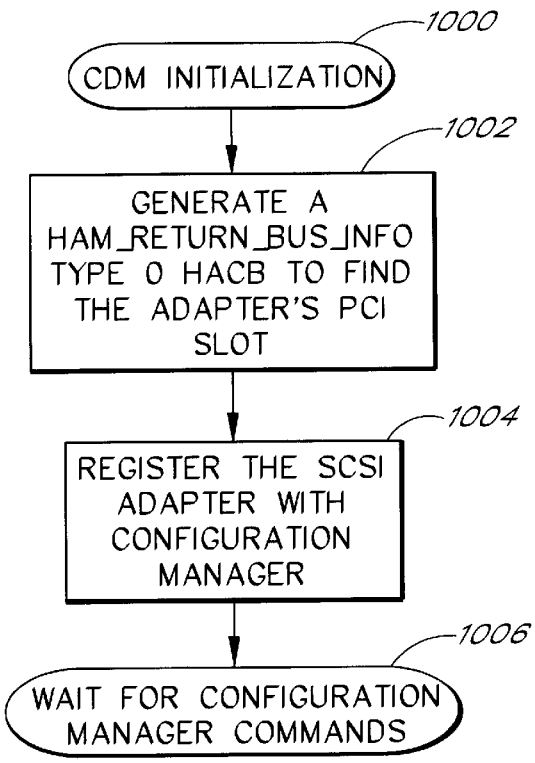
FIGS. 10A, 10B and 10C are flowcharts showing one process by which the configuration manager may suspend and restart I/O for mass hot swapping storage adapters under the NetWare Operating System, show in FIG. 8.
Figure 10C:
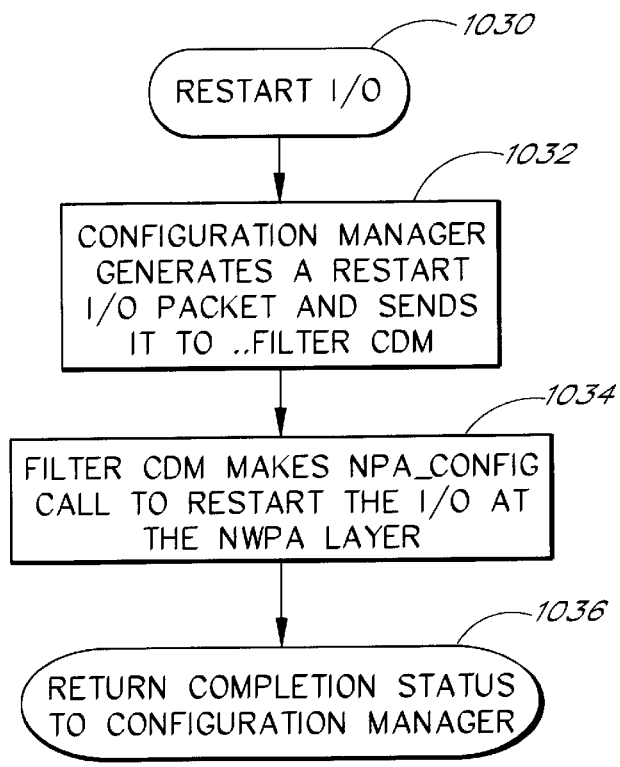
Figure 10B:
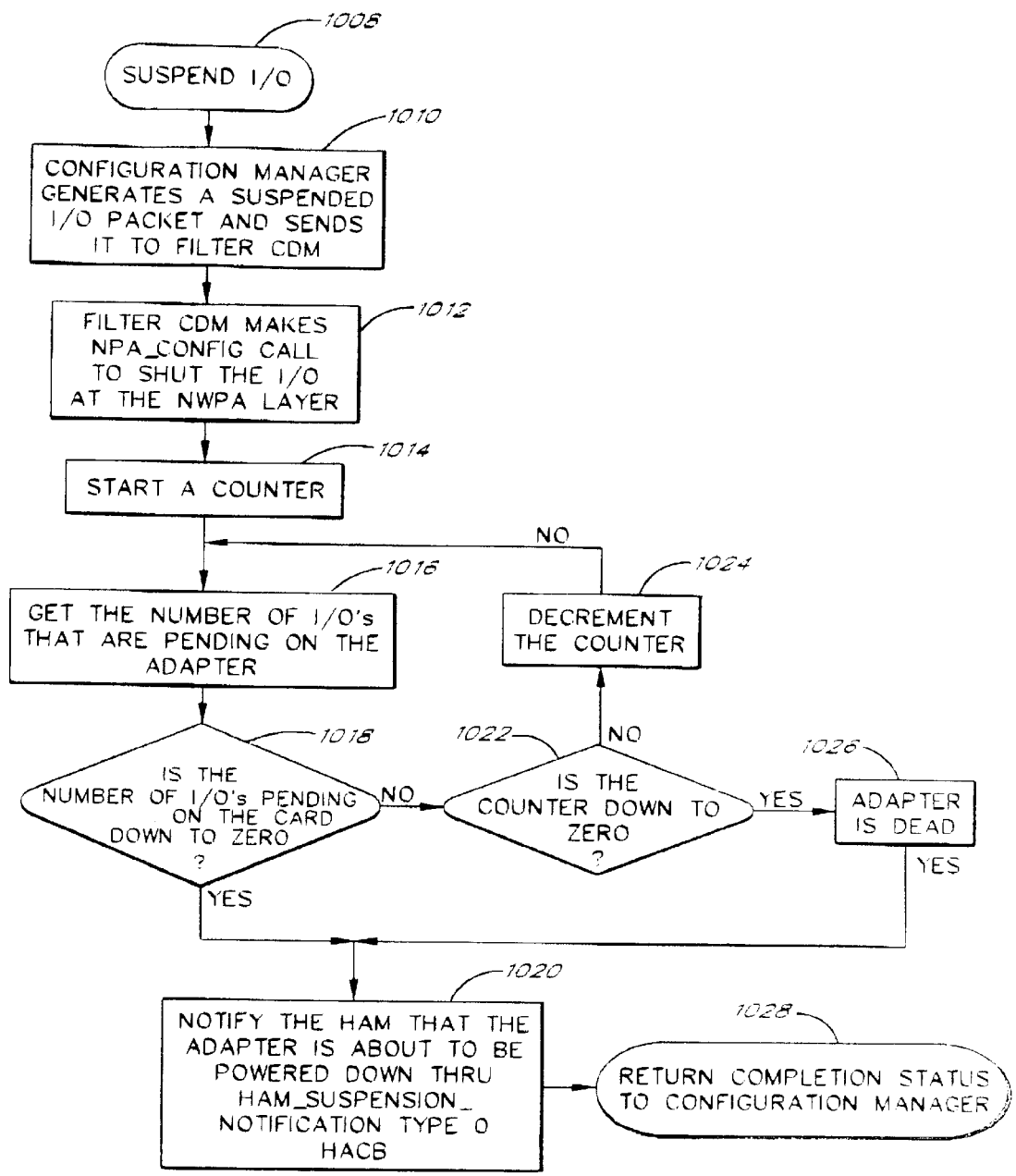

FIGS. 10A, 10B and 10C illustrate the process by which the filter CDM 513 (FIG. 5) and the configuration manager 500 freeze and resume the I/O to mass storage adapters such as the adapter 102. FIG. 10A illustrates the initialization routine for the Filter CDM 513.

FIG. 10A describes the Filter CDM 513 initialization process. Starting in state 1000, the NetWare Operating System starts the execution of Filter CDM 513. The Filter CDM 513 obtains the physical PCI location of each adapter (state 1002). The Filter CDM obtains this information by making a Novell NetWare Operating System call named HAM_Return_Bus_Info( ). At state 1004, the Filter CDM 513 registers the mass storage adapter 102 with the configuration manager 500. The Filter CDM 513 also registers to receive "Adapter Attention" events, to get notification from the NetWare Operating System when an adapter 310 fails. Finally, in state 1006, the Filter CDM 513 waits for requests to suspend and restart the I/O from the configuration manager 500.

FIG. 10B illustrates the process by which the configuration manager 500 and the Filter CDM 513, shown in FIG. 5, suspend the I/O to a mass storage adapter. At state 900 (FIG. 9A), the configuration manager 500 has determined that the current suspend or restart request applies to a mass storage adapter, and proceeds to state 904. If the request is a suspend request, the configuration manager 500 proceeds to state 1008 (FIG. 10B). If the request is a restart, the configuration manager 500 proceeds to state 1030 (FIG. 10C).

The configuration manager 500 receives the request and generates a packet to suspend I/O (state 1010). The suspended I/O packet contains instructions to the Filter CDM 513 to freeze a particular mass storage adapter. The Filter CDM 513 receives the packet from the configuration manager 500 (state 1012). The Filter CDM 513 then makes a NetWare Operating System call to the NPA_Config( ) routine. The NPA_Config( ) routine halts all communication to a specified mass storage adapter 108 at the NWPA 510.

The NPA_Config( ) routine also determines if all pending requests have been processed or not. At state 1014, the Filter CDM 513 starts a counter. The Filter CDM 513 uses this counter to ascertain whether the mass storage adapter 102 is malfunctioning as will be explained below. The Filter CDM 513 queries the NPA_Config( ) routine to find the number of outstanding I/O requests to a specified mass storage adapter (decision state 1018). If the Filter CDM 513 finds that the number of pending I/O requests to a particular mass storage adapter is zero, the Filter CDM 513 proceeds to notify the HAM 512 that the adapter is about to be powered down by the call HAM_Suspension_Notification( ) (state 1020). If the number of requests pending on an adapter is not zero, the Filter CDM 513 checks to see if the counter is down to zero (decision state 1022). If the counter is not zero, the Filter CDM 513 decrements the counter (state 1024). The Filter CDM 513 repeats the process of reading the outstanding I/O (state 1016) until there are zero I/Os pending on the mass storage adapter or the counter reaches zero (state 1026). If the counter reaches zero, the Filter CDM 513 assumes that the mass storage adapter is malfunctioning (state 1026). The Filter CDM 513 proceeds to shut down the mass storage adapter, losing the pending I/Os (state 1020). After the Filter CDM 513 shuts down the adapter, the Filter CDM 513 relays the status of the I/O suspension to the configuration manager 500 (state 1028).

Referring to FIG. 10C, states 1030 to 1036 describe the process by which the communication between the mass storage adapter and an adapter driver is restarted. At state 1030, a request is made to restart the I/O. Next, the configuration manager 500 generates a restart I/O packet (state 1032). The configuration manager 500 sends this packet to the Filter CDM 513. The Filter CDM 513 receives this I/O packet to restart the communication between the mass storage adapter and the adapter driver (state 1034). The Filter CDM 513 makes a call to NPA_Config( ) to restart the communication between the mass storage adapter and the adapter driver. After the resumption of communication to the mass storage adapter 102, the Filter CDM 513 returns completion status to the configuration manager 500 (state 1036).

Adapter Hot Plug Under the Windows NT Operating System

Figure 11:
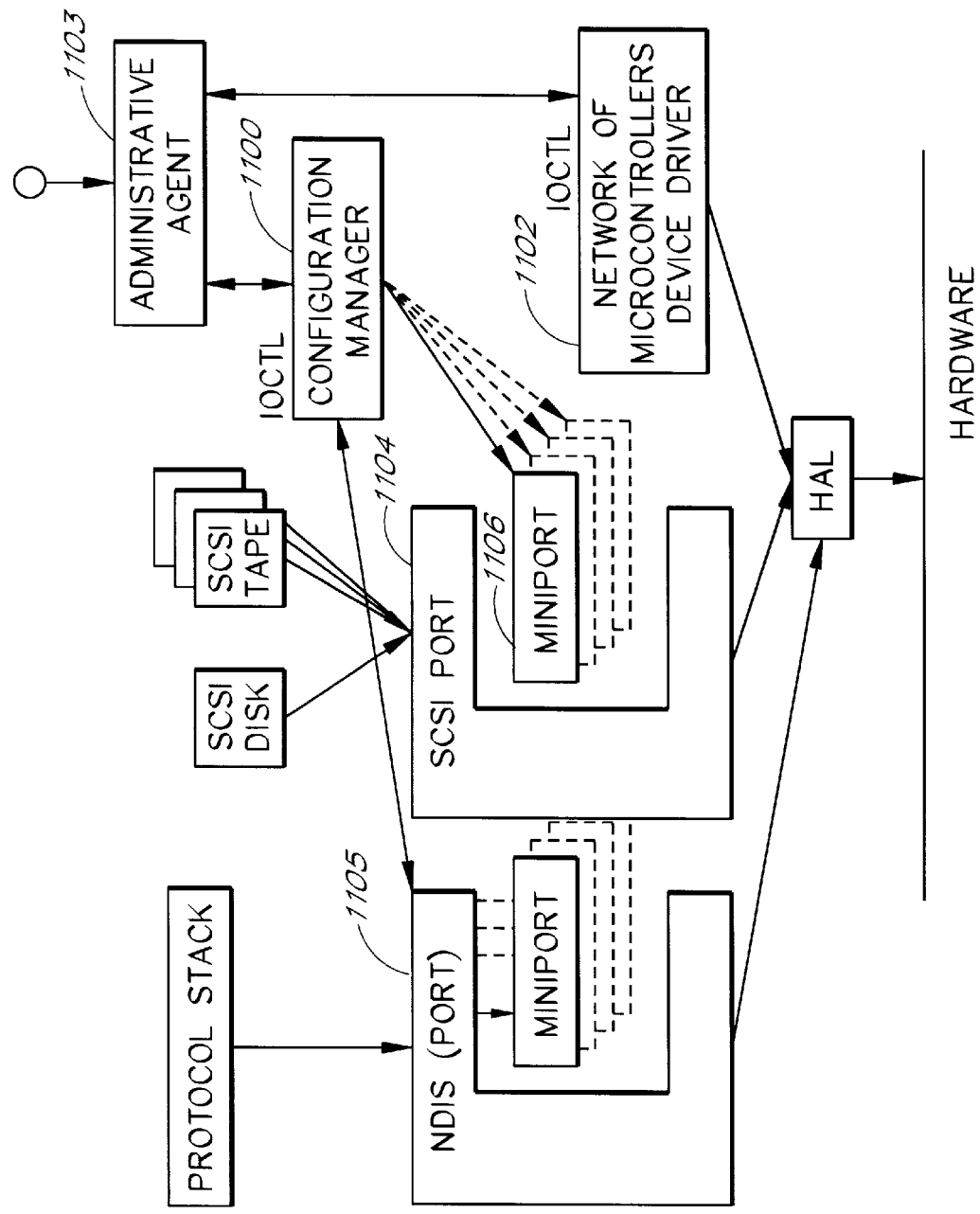
FIG. 11 is a block diagram illustrating a portion of the Windows NT Operating System and a configuration manager which both reside on the fault tolerant computer system, shown in FIGS. 2 and 3.

FIG. 11 is a block diagram illustrating various components of one embodiment of the hot plug adapter invention as implemented under the Windows NT Operating System (WinNT). A configuration manager 1100 controls the process of hot adding and swapping an adapter. An administrative agent 1103 initiates requests to the configuration manager 1100 and the network of microcontrollers 225 to oversee the process of hot add and swap of an adapter. The administrative agent 1103 initiates requests to the configuration manager 1100 to suspend and restart the communications of an adapter 310. The administrative agent 1103 initiates requests to the microcontroller network device driver 1102 to turn on and off the power to the slots 241 and 266 (FIGS. 2 and 3). The network of microcontrollers 225 is one way of implementing the hot plug hardware 312 (FIG. 4).

The configuration manager 1100 controls the communication between each adapter and adapter driver by calling the SCSI port 1104 and NDIS 1105. SCSI port and NDIS are interfaces which are exported by the Windows NT Operating system. These interfaces are designed to interact with a miniport 1106 which is an instance of an adapter driver 308. In Windows NT, each adapter will have its own miniport.

As previously mentioned, FIGS. 6, 7 and 8 illustrate a generic process by which alternative embodiments of the present invention may perform the hot add and swap of adapters. FIGS. 6, 7 and 8 describe not only the hot add and swap process under the NetWare Operating System, but they also describe the hot add and swap process under Windows NT Operating System (WinNT). FIGS. 12 through 17 focus on the process by which the hot add and swap process shown in FIGS. 6, 7, and 8 may be implemented using the WinNT.

Figure 12:
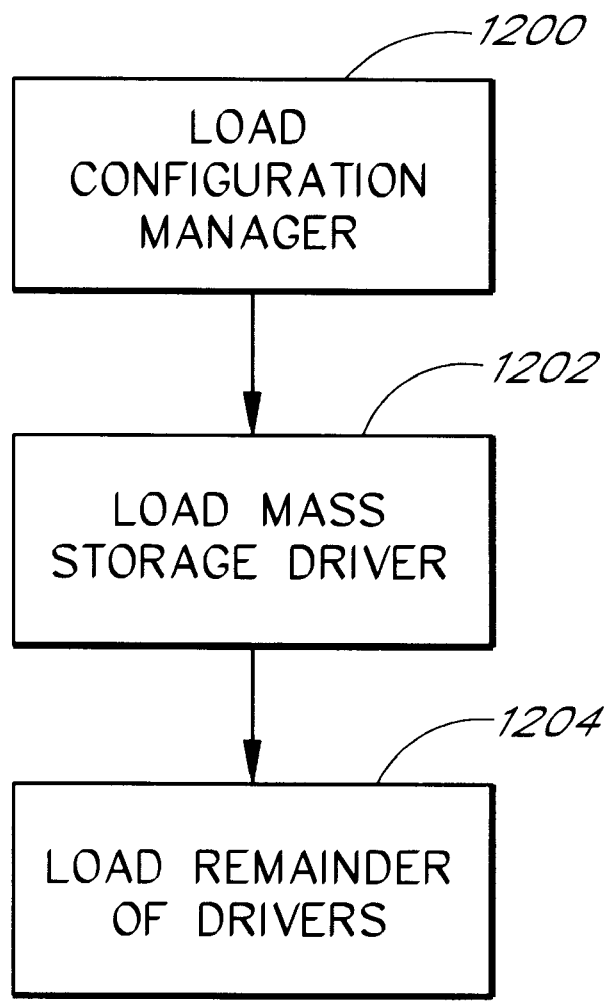
FIG. 12 is one embodiment of a flowchart showing the process by which the Windows NT Operating System initializes the adapter (miniport) drivers shown in FIG. 11 at boot time.

FIG. 12 is a flowchart showing one embodiment of the process by which WinNT loads each adapter driver at system boot time. WinNT maintains an ordered list of adapter drivers that are registered with the operating system. This list determines the order in which each adapter gets initialized by WinNT. In one embodiment of the invention the configuration manager 1100 is registered to load first at state 1200. Installation software has modified the list of adapter drivers to load the configuration manager 1100 first, so that the other adapter drivers can register with the configuration manager 1100 during their initialization. Moving to state 1202, WinNT proceeds to load the mass storage driver. Traditionally, the adapter driver for one or more the mass storage adapters is the first adapter driver loaded by WinNT, so that other drivers have access to a mass storage medium. WinNT then loads the remainder of the drivers (state 1204).

Figure 13:
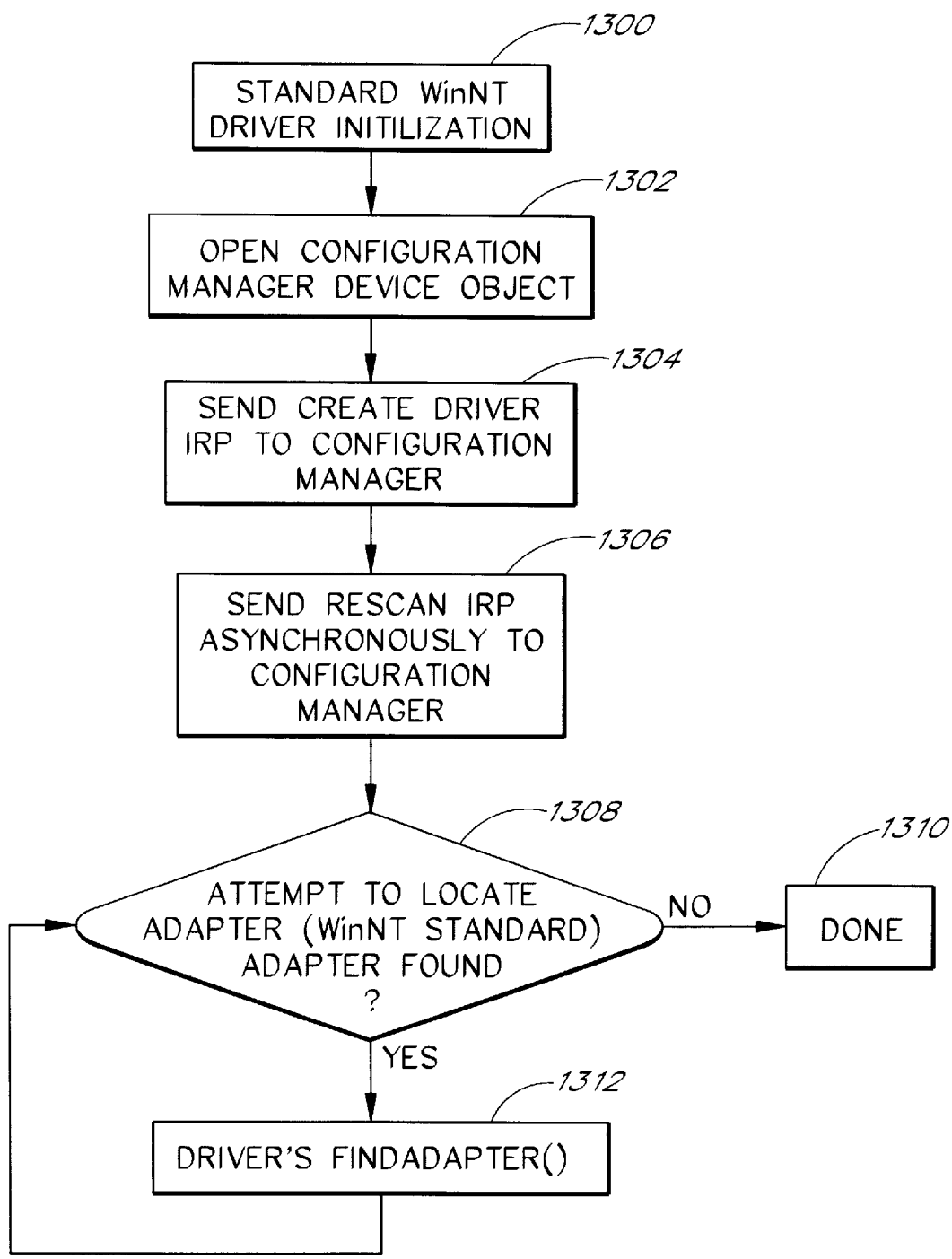
FIG. 13 is a flowchart illustrating one embodiment of a process by which a loaded adapter driver of FIG. 12 initializes itself with the configuration manager under the Windows NT Operating System.

FIG. 13 is a block diagram illustrating one embodiment of the method by which an adapter driver registers with the configuration manager 1100 during its initialization. Starting at state 1300, WinNT performs the standard adapter driver initialization by calling the DeviceEntry( ) function for each adapter driver. At state 1302, the adapter driver's DeviceEntry( ) opens a configuration manager device object. The configuration manager 1100 device object is a "handle" by which software, such as the adapter driver 1106, can communicate with the configuration manager 1100. The adapter driver 1106 sends a request to the configuration manager 1100 to register the adapter driver 1106 with the configuration manager 1100 (state 1304). The adapter driver 1106 communicates with the configuration manager 1100 by a predefined dispatch routine. The method of creating a Windows NT dispatch routine is described in the "Windows NT Device Driver Book", by Art Baker, at pages 163 to 179 which are hereby incorporated by reference.

At state 1306, the adapter driver such as driver 308 sets an asynchronous I/O Request Packet (IRP) for rescanning.

The I/O Request Packet is a data structure defined by the Windows NT Operating System. The adapter driver 308 allocates and registers an IRP with the Windows NT operating system. The rescan IRP contains a pointer to completion routine within the adapter driver 308. The adapter driver 308 sets the completion routine to a procedure which scans for and initializes an adapter 310. During a hot add of an adapter, the initialization routine is called by the configuration manager 1100 to configure the adapter state. Still at state 1306, the adapter driver 308 calls to the SCSI port 1104 to finish the adapter's initialization Next, the SCSI port 1104 searches the bus for an adapter 310 (decision state 1308). If the SCSI port 1104 finds an adapter 310, the SCSI port 1104 calls each driver's FindAdapter( ) routine (state 1312). In addition to performing the traditional functions of the FindAdaptero routine, FindAdaptero registers each found adapter 310 with the configuration manager 1100. The configuration manager 1100 then retrieves the configuration information of the adapter 310. The configuration manager 1100 saves the configuration information for each adapter 310 in a linked list of data. The configuration manager 1100 maintains this linked list of data in case an adapter 310 fails. Upon the failure of an adapter 310, the configuration manager 1100 reprograms a replacement adapter's configuration space.

After finding an adapter 310 on the bus, the SCSI port 1104 returns to search for additional adapters 310 (decision state 1308). Once the SCSI port 1104 configures all of the adapters 310, the SCSI port 1104 ends (state 1310).

Figure 14:
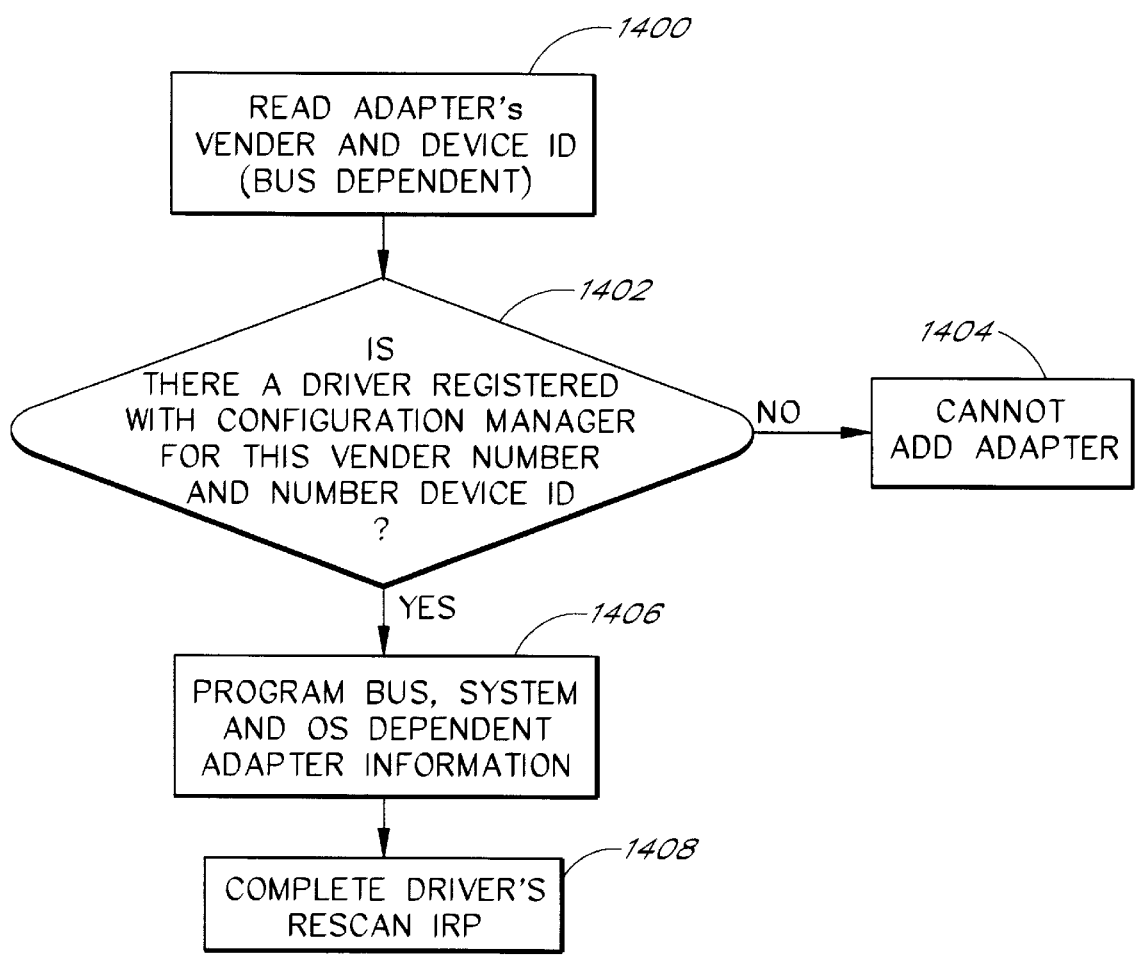
FIG. 14 is one embodiment of a flowchart showing the process by which the configuration manager handles a request to perform the hot add of an adapter under the Windows NT Operating System, shown in FIG. 11.

FIG. 14 is a flowchart illustrating the process by which one embodiment of the configuration manager 1100 handles a request to configure a hotly added adapter 310. FIG. 14 is a more detailed description of state 604 shown in FIG. 6 and the state 714 shown in FIG. 7.

Starting at state 1400, the configuration manager 1100 reads the vendor and adapter ID of the adapter 310 that has been hotly added. The vendor and adapter ID are typically maintained in Read Only Memory (ROM) on an adapter 310.

Moving to state 1402, the configuration manager 1100 makes an internal check to see if an adapter driver 308 had previously registered with the configuration manager 1100. If no adapter driver 308 registered for this adapter 310, the configuration manager 1100 returns an error (state 1404). Otherwise, if there is a driver registered for the adapter 310, the configuration manager, programs the bus, system and operating system adapter information (state 1406).

In one embodiment of the invention, the configuration information is calculated on an ad-hoc basis. In another implementation of the invention, the configuration information is maintained in a template. The template is based upon the configuration information of an adapter of the same type located on a reference system. The reference system is another fault tolerant computer system. After following the traditional initialization process of an adapter, a snapshot is taken of the configuration space for each adapter of the PC buses 241 and 256 (FIGS. 2 and 3). The snapshot of the configuration space for each adapter is used to build a template which is incorporated into the configuration manager 1100.

Once the configuration space of the adapter 310 is initialized, the configuration manager 1100 completes the adapter initialization (state 1408). Although the configuration space of the adapter 310 is finished, the adapter driver 308 completes the initialization process by configuring any adapter specific requirements. For example, SCSI adapters often contain a microcontroller for controlling an SCSI bus. The adapter driver 308 initializes this microcontroller (state 1408). The process by which the configuration manager 1100 returns control to the adapter driver 308 is by calling the completion routine of the rescan IRP that the adapter driver 308 created during the adapter drive's initialization.

Figure 15:
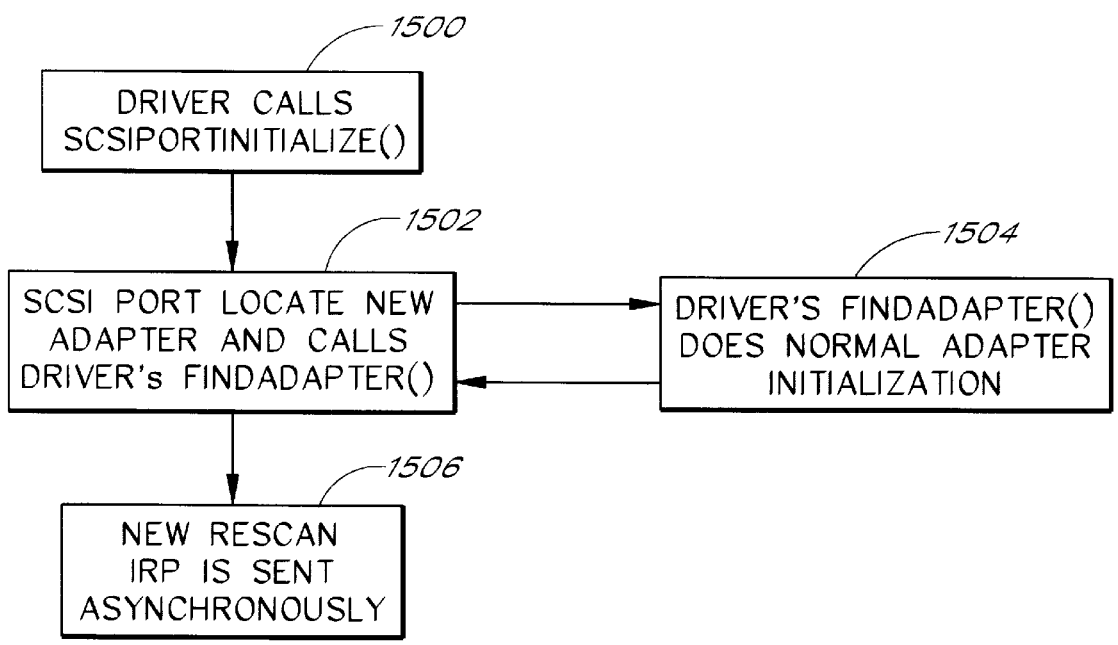
FIG. 15 is one embodiment of a flowchart showing the process by which an adapter driver locates and initializes a mass storage adapter under the Windows NT Operating System in the hot add process shown in FIG. 14.

FIG. 15 is a flowchart illustrating one embodiment of the process by which the adapter driver such as the driver 308 finishes initializing a hotly added adapter such as the adapter 310. The configuration manager 1100 calls the adapter driver through the rescan completion routine that the adapter driver 308 created during its initialization (state 1508). The adapter driver 308 then calls the SCSI port's initialize routine, SCSIportInitalize( ). The SCSI port locates the new adapter 310 (state 1502). The SCSI port 1104 calls the FindAdaptero routine for each adapter driver 308 in the 1106 (state 1504). The adapter driver 308 then creates a new asynchronous rescan IRP for the next occurrence of a hot add of an adapter (state 1506).

Figure 16:
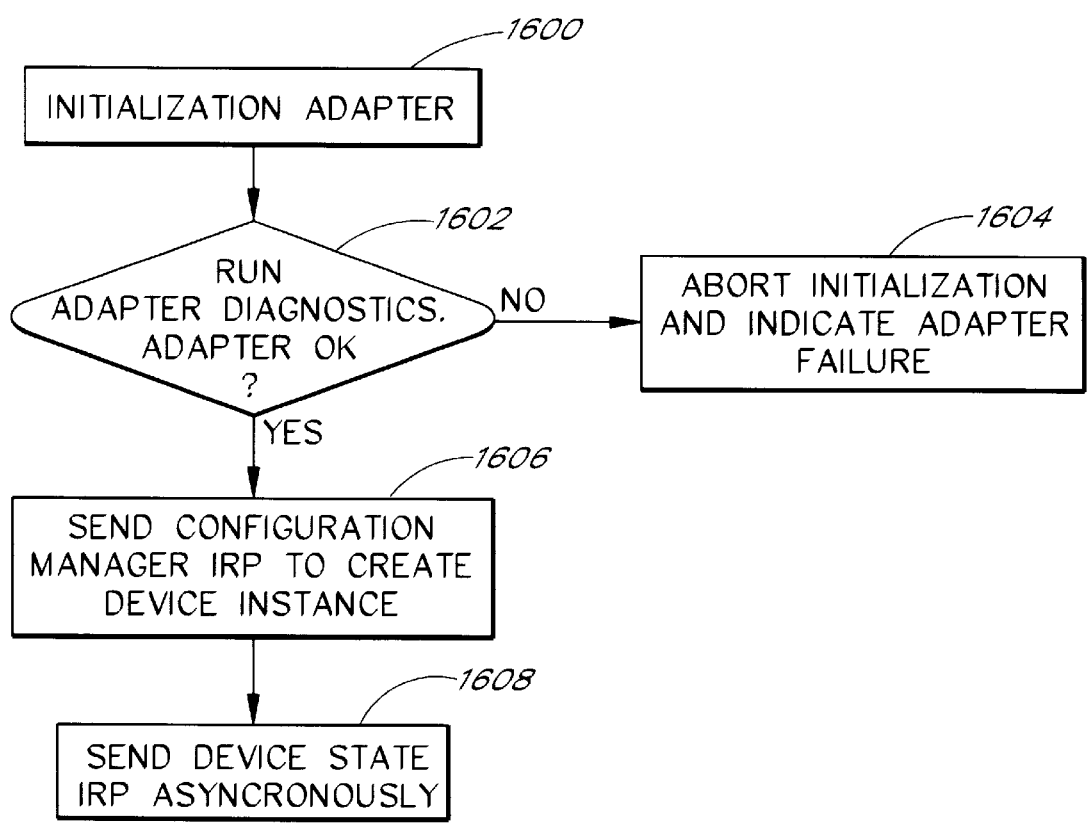
FIG. 16 is one embodiment of a flowchart showing the process by which the FindAdapter( ) routine initializes an adapter during the hot add locate and initialize process of FIG. 15.

FIG. 16 is a flowchart showing one embodiment of the process by which the FindAdaptero routine for an adapter handles a hot add request. FIG. 16 provides a more detailed explanation of the state 1504 shown in FIG. 15. Starting in state 1600, the FindAdapter( ) routine performs the traditional initialization functions that are associated with the routine. For example, in a Qlogic PCI SCSI adapter the FindAdaptero routine reads the configuration information, maps the I/O registers for the adapter, resets the microcontroller on the adapter, checks the SCSI ID, and initializes the virtual and physical queue addresses.

Moving to state 1602, the FindAdaptero routine performs some optional adapter diagnostics. If the adapter 310 performs the diagnostics and the adapter 310 finds an error, the FindAdaptero routine proceeds to state 1604. Otherwise, if no error was found, the FindAdaptero routine sends an IRP to the configuration manager 1100 creating a Device Instance for the newly hot added card (1606). The configuration manager 1100 sends an asynchronous device state IRP (state 1608). The configuration manager 1100 calls the completion routine of the device state IRP when the user has requested a hot swap.

Figure 17:
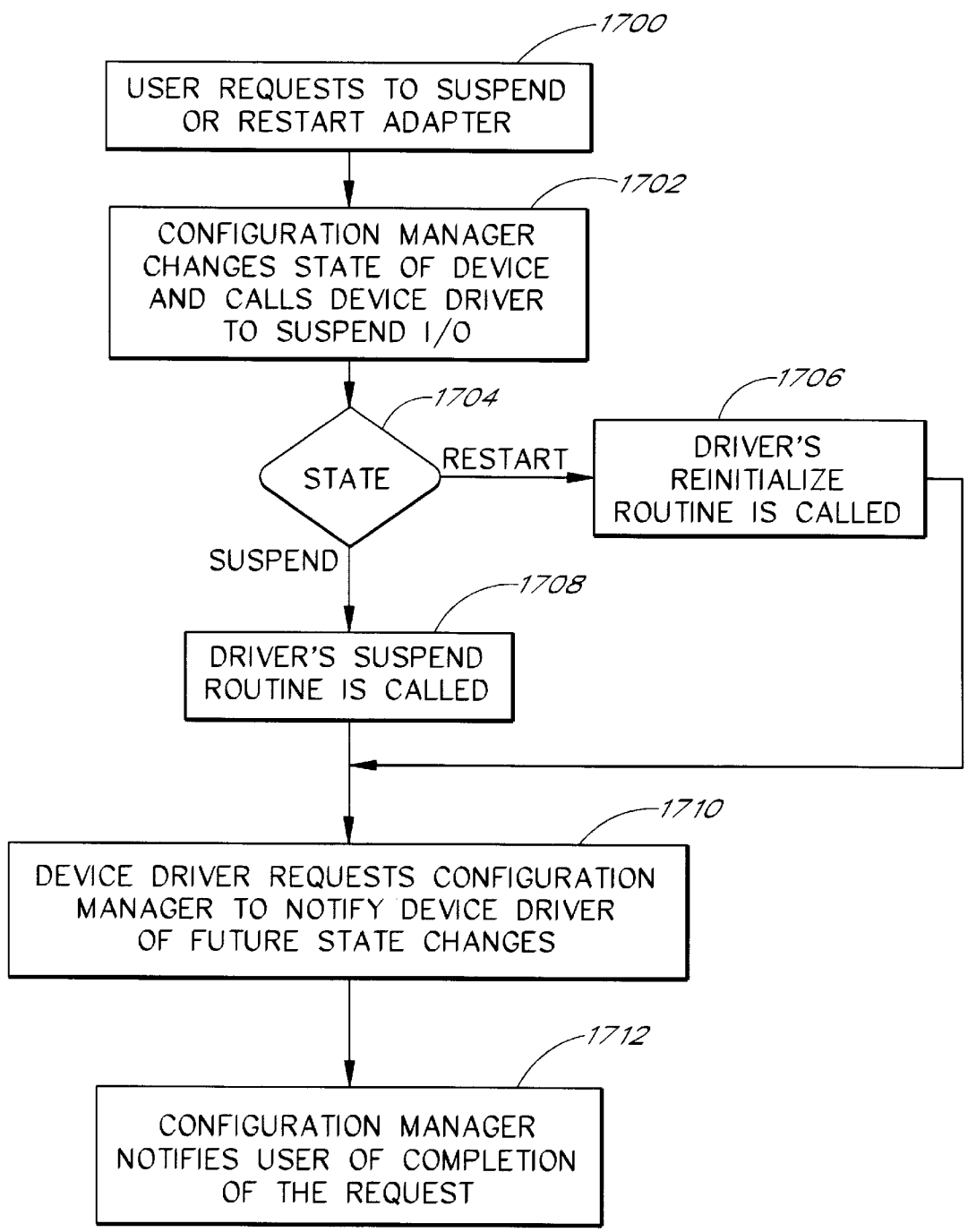
FIG. 17 is one embodiment of a flowchart showing the process by which the configuration manager suspends and resumes the state of an adapter under the Windows NT Operating System during the hot swap shown in FIG. 8.

FIG. 17 is a flowchart illustrating one embodiment of the process by which the configuration manager 1100 suspends and restarts the state of an adapter 310 under WinNT. Starting at state 1700, a user, through an administrative agent 1103, requests to suspend or restart communications to a specified adapter 310. Moving to state 1702, the configuration manager 1100 records the new state of the adapter 310. The configuration manager 1100 then finds and calls the device state IRP's completion routine of the adapter 310. The configuration manager 1100 finds the correct completion routine by examining each of the device state IRPs posted by the adapter drivers 308.

The completion routine then determines whether the user has requested to suspend or resume an adapter 310 state (decision state 1704). If a user requests to restart an adapter 310, the completion routine calls the adapter driver's reinitialize routine (state 1706). Otherwise, if the user requests to suspend an adapter 310, the completion routine calls the driver's suspend routine (state 1708). After an adapter's re-initialization (state 1706) or suspension (state 1708), the adapter driver 308 creates another device state IRP (1710). The configuration manager 1100 uses the completion routine of this IRP to call the adapter driver 308 to change the state of the adapter 310 at a later point in time for future hot swaps. The configuration manager 1100 then notifies the user of the result of the user's request to suspend or resume an adapter 310 (state 1712).

While the above detailed description has shown, described, and pointed out the fundamental novel features of the invention as applied to various embodiments, it will be understood that various omissions and substitutions and changes in the form and details of the system illustrated can be made by those skilled in the art, without departing from the intent of the invention.

What is claimed is:

1. A computer system capable of hot adding an adapter and including at least one programmable data processor, comprising:

a central processing unit;

a memory;

a power management module capable of enabling and disabling power to a selected one of the adapters while the computer is operating, wherein the programmable data processor receives requests from the central processing unit and controls the power to the adapter in response to requests from the central processing unit, and wherein the programmable data processor determines whether a received request is to disable or enable power; and a configuration manager capable of programming a hot added adapter so that the hot added adapter can communicate with the computer, wherein the computer requests the power management module to enable power to the hot added adapter while the computer is operting.

2. The computer system as defined in claim 1, wherein the adapters are connected to the computer by a PCI bus.

3. The computer system as defined in claim 1, wherein the adapters are connected to the computer by a CardBus.

4. The computer system as defined in claim 1, wherein the adapters are connected to the computer by an ISA bus.

5. The computer system as defined in claim 1, wherein the adapters are connected to the computer by an EISA bus.

6. The computer system as defined in claim 1, wherein at least one of the adapters controls I/O to other computers.

7. The computer system as defined in claim 1, further comprising an operating system.

8. The computer system as defined in claim 7, wherein the operating system is the NetWare Operating System.

9. The computer system as defined in claim 7, wherein the operating system is the Windows NT Operating system.

10. The computer system as defined in claim 1, wherein at least one of the adapters controls I/O to SCSI devices.

11. The computer system as defined in claim 1, wherein at least one of the adapters controls mass storage devices.

12. The computer system as defined in claim 3, wherein at least one adapter is a Qlogic adapter.

13. A computer system capable of hot adding an adapter and including at least one programmable data processor, comprising:

a memory; and a configuration manager capable of programming a hot added adapter so that the hot added adapter can communicate with the computer, wherein the programmable data processor turns on the power to the hot added adapter while the computer is operating, and wherein the programmable data processor receives requests from a central processing unit and controls the power to the adapter in response to requests from the central processing unit, and wherein the programmable data processor determines whether a received request is to disable or enable power.

14. A computer system capable of hot adding an adapter and including at least one programmable data processor, comprising:

a central processing unit;

a power management module capable of enabling and disabling power to the adapter while the computer is operating, wherein the programmable data processor receives requests from the central processing unit and controls the power to the adapter in response to requests from the central processing unit, and wherein the programmable data processor determines whether a received request is to disable or enable power; and a configuration manager capable of programming a hot added adapter so that the hot added adapter can communicate with the computer, wherein the computer requests the power management module to enable power to the hot added adapter while the computer is operating.

* * * * *

UNITED STATES PATENT AND TRADEMARK OFFICE
CERTIFICATE OF CORRECTION

PATENT NO. : 6,499,073 B1
DATED : December 24, 2002
INVENTOR(S) : Wallach et al.

It is certified that error appears in the above-identified patent and that said Letters Patent is hereby corrected as shown below:

<u>Title page,</u>
Item [73], replace the Assignee "Micron Electronics, Inc., Nampa, ID" with
-- Micron Technology, Inc., Boise, ID --.

Signed and Sealed this

First Day of July, 2003

JAMES E. ROGAN
*Director of the United States Patent and Trademark Office*